(12) United States Patent
Dudrenov et al.

(10) Patent No.: US 12,294,692 B2
(45) Date of Patent: May 6, 2025

(54) DISPLAYS WITH VIEWER TRACKING FOR VERTICAL PARALLAX CORRECTION

(71) Applicant: Apple Inc., Cupertino, CA (US)

(72) Inventors: Pavel V Dudrenov, San Francisco, CA (US); Zachary D Corley, Newark, CA (US); Edwin Iskandar, San Jose, CA (US); Felipe Bacim De Araujo E Silva, San Jose, CA (US); Seung Wook Kim, San Jose, CA (US); Yang Li, San Jose, CA (US); Menelik Baye Yimam, San Jose, CA (US); Gilles M Cadet, Agoura Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/189,542

(22) Filed: Mar. 24, 2023

(65) Prior Publication Data

US 2023/0421749 A1    Dec. 28, 2023

Related U.S. Application Data

(60) Provisional application No. 63/355,031, filed on Jun. 23, 2022.

(51) Int. Cl.
| | |
|---|---|
| *H04N 13/368* | (2018.01) |
| *H04N 13/122* | (2018.01) |
| *H04N 13/305* | (2018.01) |
| *H04N 13/376* | (2018.01) |
| *H04N 13/383* | (2018.01) |
| *H04N 13/398* | (2018.01) |

(52) U.S. Cl.
CPC ......... *H04N 13/368* (2018.05); *H04N 13/122* (2018.05); *H04N 13/305* (2018.05); *H04N 13/376* (2018.05); *H04N 13/383* (2018.05); *H04N 13/398* (2018.05)

(58) Field of Classification Search
CPC .. H04N 13/122; H04N 13/305; H04N 13/351; H04N 13/368; H04N 13/376; H04N 13/383; H04N 13/398
USPC .......................................................... 348/51
See application file for complete search history.

(56) References Cited

U.S. PATENT DOCUMENTS

| | | | |
|---|---|---|---|
| 7,425,069 | B2 | 9/2008 | Schwerdtner et al. |
| 8,917,441 | B2 | 12/2014 | Woodgate et al. |

(Continued)

FOREIGN PATENT DOCUMENTS

| | | |
|---|---|---|
| EP | 2849443 A1 | 3/2015 |
| WO | 2011001372 A1 | 1/2011 |

*Primary Examiner* — Christopher S Kelley
*Assistant Examiner* — Ana Picon-Feliciano
(74) *Attorney, Agent, or Firm* — Treyz Law Group, P.C.; Joseph F. Guihan; Jinie M. Guihan

(57) ABSTRACT

An electronic device may include a stereoscopic display with a plurality of lenticular lenses that extend across the length of the display. The lenticular lenses may be configured to enable stereoscopic viewing of the display such that a viewer perceives three-dimensional images. The display may have different viewing zones that account for horizontal parallax as a viewer moves horizontally relative to the display. The display may be dimmed globally, blurred, and/or composited with a default image based on the detected vertical position of the viewer. The display may render content that compensates for the real-time vertical positions of multiple viewers.

21 Claims, 27 Drawing Sheets

(56) References Cited

U.S. PATENT DOCUMENTS

| | | |
|---|---|---|
| 9,311,771 B2 | 4/2016 | Kelly |
| 9,361,727 B2 | 6/2016 | Fuchs et al. |
| 9,648,308 B2 | 5/2017 | Hinnen et al. |
| 9,667,952 B2 | 5/2017 | Itoh |
| 9,712,810 B2 | 7/2017 | Smithwick et al. |
| 9,927,623 B2 | 3/2018 | Johnson et al. |
| 9,986,227 B2 | 5/2018 | Smithwick et al. |
| 10,136,125 B2 | 11/2018 | Yoon et al. |
| 10,237,541 B2 | 3/2019 | Hasegawa et al. |
| 2007/0008619 A1 | 1/2007 | Cha et al. |
| 2012/0062991 A1 | 3/2012 | Krijn et al. |
| 2014/0313298 A1* | 10/2014 | Usukura ................ G02B 30/31 |
| | | 348/59 |
| 2015/0015668 A1 | 1/2015 | Bennett et al. |
| 2015/0077526 A1* | 3/2015 | Kim .................... H04N 13/349 |
| | | 348/51 |
| 2015/0145977 A1 | 5/2015 | Hoffman |
| 2016/0266398 A1 | 9/2016 | Poon et al. |
| 2018/0213211 A1* | 7/2018 | Tomizawa ............. G02B 30/30 |
| 2018/0213213 A1* | 7/2018 | Woods ................ H04N 13/117 |
| 2021/0072428 A1* | 3/2021 | Huang ................ H10K 59/879 |
| 2023/0030931 A1* | 2/2023 | Takahashi ............ H04N 13/302 |

\* cited by examiner

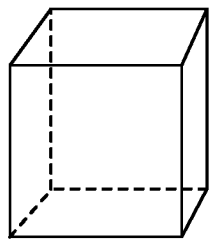 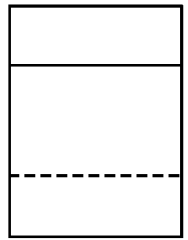 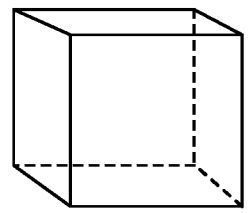
*FIG. 7A*  *FIG. 7B*  *FIG. 7C*

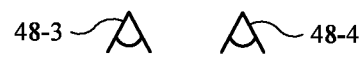
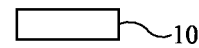
FIG. 24A
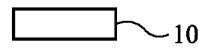
FIG. 24B

DISPLAYS WITH VIEWER TRACKING FOR VERTICAL PARALLAX CORRECTION

This application claims the benefit of U.S. Provisional Patent Application No. 63/355,031, filed Jun. 23, 2022, which is hereby incorporated by reference herein in its entirety.

FIELD

This relates generally to electronic devices, and, more particularly, to electronic devices with displays.

BACKGROUND

Electronic devices often include displays. In some cases, displays may include lenticular lenses that enable the display to provide three-dimensional content to the viewer. The lenticular lenses may be formed over an array of pixels such as organic light-emitting diode pixels or liquid crystal display pixels.

SUMMARY

An electronic device may include a lenticular display. The lenticular display may have a lenticular lens film formed over an array of pixels. A plurality of lenticular lenses may extend across the length of the display. The lenticular lenses may be configured to enable stereoscopic viewing of the display such that a viewer perceives three-dimensional images.

The electronic device may also include an eye and/or head tracking system. The eye and/or head tracking system uses sensors to obtain sensor data regarding the position of a viewer of the display. The captured images may be used to determine a viewer's eye position.

The display may have a number of independently controllable viewing zones. Each viewing zone displays a respective two-dimensional image. Each eye of the viewer may receive a different one of the two-dimensional images, resulting in a perceived three-dimensional image.

The different viewing zones may account for horizontal parallax as a viewer moves horizontally relative to the display. To prevent visible artifacts caused by vertical parallax mismatch as a viewer moves vertically relative to the display, the displayed images may be compensated based on a vertical position of the viewer.

The display may be dimmed globally, blurred, and/or composited with a default image based on the vertical position of the viewer. The content on the display may be rendered for a baseline viewing angle (where there is no vertical parallax mismatch). The magnitude of applied dimming, blur, and/or compositing may increase with increasing deviation of the viewer from the baseline viewing angle.

In another possible arrangement, the display may render content that compensates for the real-time vertical position of the viewer. Content rendering circuitry may render a plurality of two-dimensional images that are each associated with a respective viewing zone. The two-dimensional images that are each associated with a respective viewing zone may be two-dimensional images of the same content at different horizontal perspectives and a single vertical perspective. The single vertical perspective may be based on the vertical eye position determined using the eye tracking system. The single vertical perspective may be updated as the vertical eye position changes to provide the image with vertical parallax that matches the vertical eye position.

When multiple viewers are viewing the display, the two-dimensional images that are each associated with a respective viewing zone may be two-dimensional images of the same content at different horizontal perspectives and different vertical perspectives. In other words, the content presented to each viewer may be updated to compensate for the vertical viewing angle of each viewer.

The lenticular lens film may include lenticular lenses that spread light in the horizontal direction but not the vertical direction. Another option for the stereoscopic display is to include a lens film that has an array of lenses. Each lens in the array of lenses spreads light in the horizontal direction and the vertical direction. In this way, the stereoscopic display may account for both horizontal parallax and vertical parallax as the viewer moves relative to the display (thus obviating the need for vertical dimming for vertical parallax correction).

BRIEF DESCRIPTION OF THE DRAWINGS

FIGS. 7A-7C are perspective views of illustrative three-dimensional content that may be displayed on different zones of the display of FIG. 6 in accordance with some embodiments.

FIGS. 24A and 24B are side views of an illustrative electronic device being viewed by multiple viewers that occupy a single viewing zone in accordance with some embodiments.

DETAILED DESCRIPTION

Figure 1:
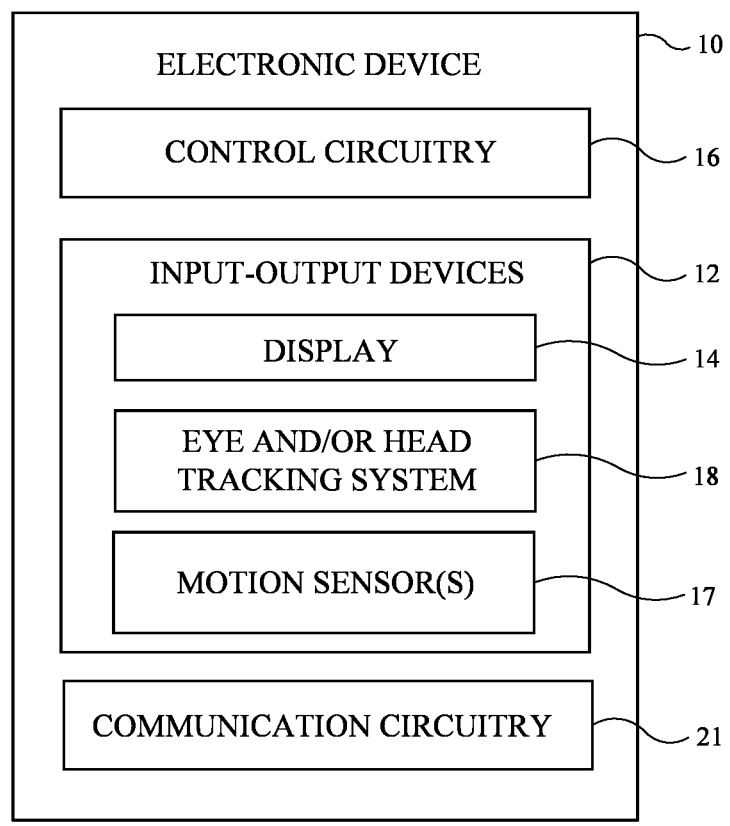
FIG. 1 is a schematic diagram of an illustrative electronic device having a display in accordance with some embodiments.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, an augmented reality (AR) headset and/or virtual reality (VR) headset, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

To support communications between device 10 and external equipment, control circuitry 16 may communicate using communications circuitry 21. Circuitry 21 may include antennas, radio-frequency transceiver circuitry, and other wireless communications circuitry and/or wired communications circuitry. Circuitry 21, which may sometimes be referred to as control circuitry and/or control and communications circuitry, may support bidirectional wireless communications between device 10 and external equipment over a wireless link (e.g., circuitry 21 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a 60 GHz link or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, and other electrical components. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Some electronic devices may include two displays. In one possible arrangement, a first display may be positioned on one side of the device and a second display may be positioned on a second, opposing side of the device. The first and second displays therefore may have a back-to-back arrangement. One or both of the displays may be curved.

Sensors in input-output devices 12 may include motion sensors 17 for detecting position, orientation, and/or motion of device 10. Motion sensors 17 may include accelerometers, magnetic sensors such as compass sensors, gyroscopes, and/or inertial measurement units that contain some or all of these sensors. Motion sensors 17 may be used to determine changes in the pose of electronic device 10. For example, at any given time electronic device 10 may have a pose defined by the roll (rotation around the front-to-back axis), pitch (rotation around the side-to-side axis), and yaw (rotation around the vertical axis) of the electronic device.

Sensors in input-output devices 12 may also include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors in input-output devices 12 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors.

Control circuitry 16 may be used to run software on device 10 such as operating system code and applications. During operation of device 10, the software running on control circuitry 16 may display images on display 14 using an array of pixels in display 14.

Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Configurations in which display 14 is an organic light-emitting diode display are sometimes described herein as an example.

Display 14 may have a rectangular shape (i.e., display 14 may have a rectangular footprint and a rectangular peripheral edge that runs around the rectangular footprint) or may have other suitable shapes. Display 14 may be planar or may have a curved profile.

Device 10 may include cameras and other components that form part of eye and/or head tracking system 18. The camera(s) or other components of system 18 may face an expected location for a viewer and may track the viewer's eyes and/or head (e.g., images and other information captured by system 18 may be analyzed by control circuitry 16 to determine the location of the viewer's eyes and/or head). This head-location information obtained by system 18 may be used to determine the appropriate direction with which display content from display 14 should be directed. Eye and/or head tracking system 18 may include any desired number/combination of infrared and/or visible light detectors. Eye and/or head tracking system 18 may optionally include light emitters to illuminate the scene. Eye and/or head tracking system may include a light detection and ranging (lidar) sensor, a time-of-flight (ToF) sensor, an accelerometer (e.g., to detect the orientation of electronic device 10), a camera, or a combination of two or more of these components. Including sensors such as a light detection and ranging (lidar) sensor, a time-of-flight (ToF) sensor, or an accelerometer may improve acquisition speeds when tracking eye/head position of the viewer.

Figure 2:
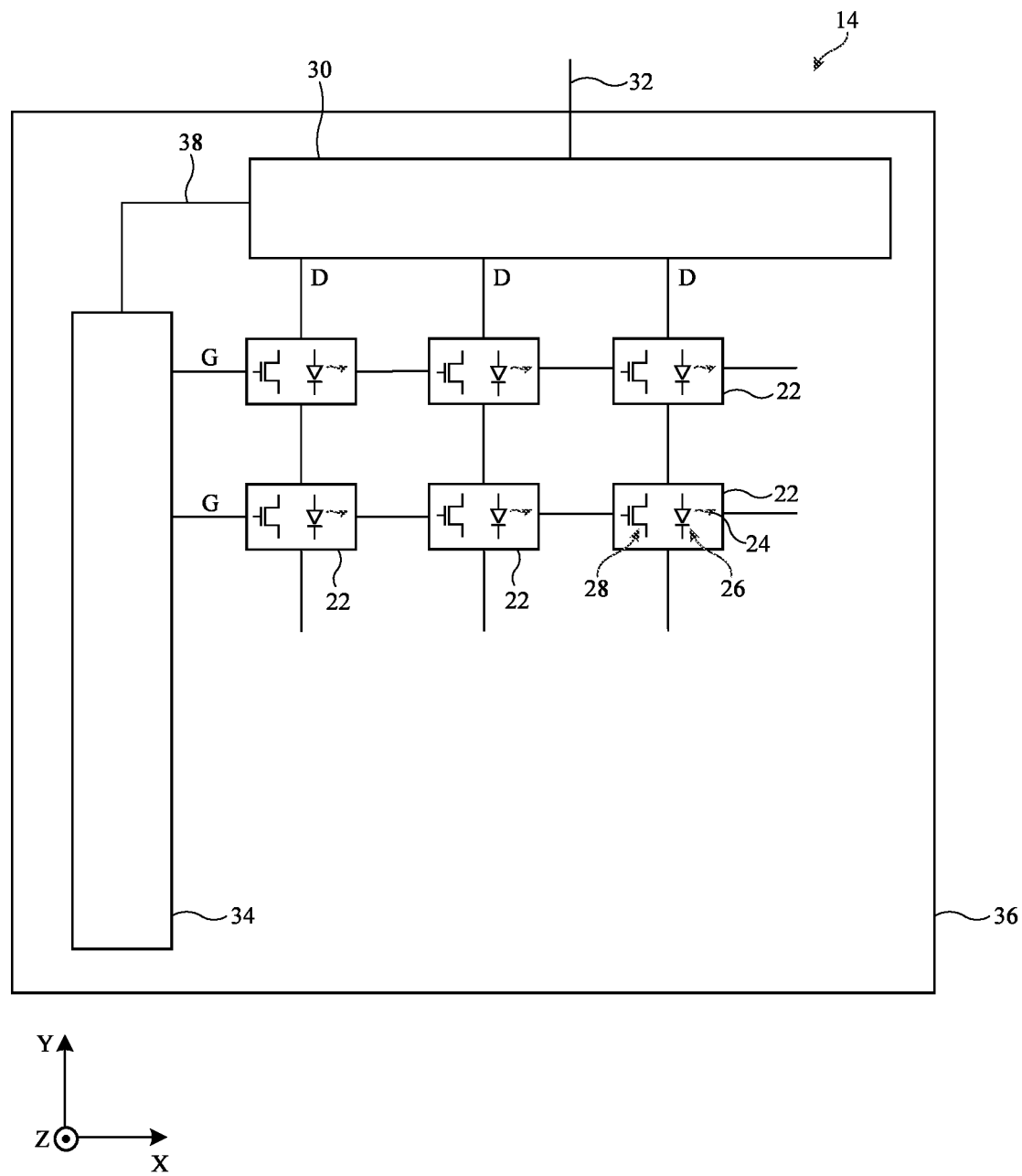
FIG. 2 is a top view of an illustrative display in an electronic device in accordance with some embodiments.

A top view of a portion of display 14 is shown in FIG. 2. As shown in FIG. 2, display 14 may have an array of pixels 22 formed on substrate 36. Substrate 36 may be formed from glass, metal, plastic, ceramic, or other substrate materials. Pixels 22 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 22 in display 14 (e.g., tens or more, hundreds or more, or thousands or more). Each pixel 22 may have a light-emitting diode 26 that emits light 24 under the control of a pixel circuit formed from thin-film transistor circuitry (such as thin-film transistors 28 and thin-film capacitors). Thin-film transistors 28 may be polysilicon thin-film transistors, semiconducting-oxide thin-film transistors such as indium gallium zinc oxide transistors, or thin-film transistors formed from other semiconductors. Pixels 22 may contain light-emitting diodes of different colors (e.g., red, green, and blue diodes for red, green, and blue pixels, respectively) to provide display 14 with the ability to display color images.

Display driver circuitry may be used to control the operation of pixels 22. The display driver circuitry may be formed from integrated circuits, thin-film transistor circuits, or other suitable circuitry. Display driver circuitry 30 of FIG. 2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply circuitry 30 with information on images to be displayed on display 14.

To display the images on display pixels 22, display driver circuitry 30 may supply image data to data lines D while issuing clock signals and other control signals to supporting display driver circuitry such as gate driver circuitry 34 over path 38. If desired, circuitry 30 may also supply clock signals and other control signals to gate driver circuitry on an opposing edge of display 14.

Gate driver circuitry 34 (sometimes referred to as horizontal control line control circuitry) may be implemented as part of an integrated circuit and/or may be implemented using thin-film transistor circuitry. Horizontal control lines G in display 14 may carry gate line signals (scan line signals), emission enable control signals, and other horizontal control signals for controlling the pixels of each row. There may be any suitable number of horizontal control signals per row of pixels 22 (e.g., one or more, two or more, three or more, four or more, etc.).

Display 14 may sometimes be a stereoscopic display that is configured to display three-dimensional content for a viewer. Stereoscopic displays are capable of displaying multiple two-dimensional images that are viewed from slightly different angles. When viewed together, the combination of the two-dimensional images creates the illusion of a three-dimensional image for the viewer. For example, a viewer's left eye may receive a first two-dimensional image and a viewer's right eye may receive a second, different two-dimensional image. The viewer perceives these two different two-dimensional images as a single three-dimensional image. This example is merely illustrative. In another possible arrangement, the stereoscopic display may use ray tracing and measurements of the angle light leaves each pixel in the display to display a three-dimensional image.

There are numerous ways to implement a stereoscopic display. Display 14 (sometimes referred to as stereoscopic display 14, lenticular display 14, three-dimensional display 14, etc.) may be a lenticular display that uses lenticular lenses (e.g., elongated lenses that extend along parallel axes), may be a parallax barrier display that uses parallax barriers (e.g., an opaque layer with precisely spaced slits to create a sense of depth through parallax), may be a volumetric display, or may be any other desired type of stereoscopic display. Configurations in which display 14 is a lenticular display are sometimes described herein as an example.

Figure 3:
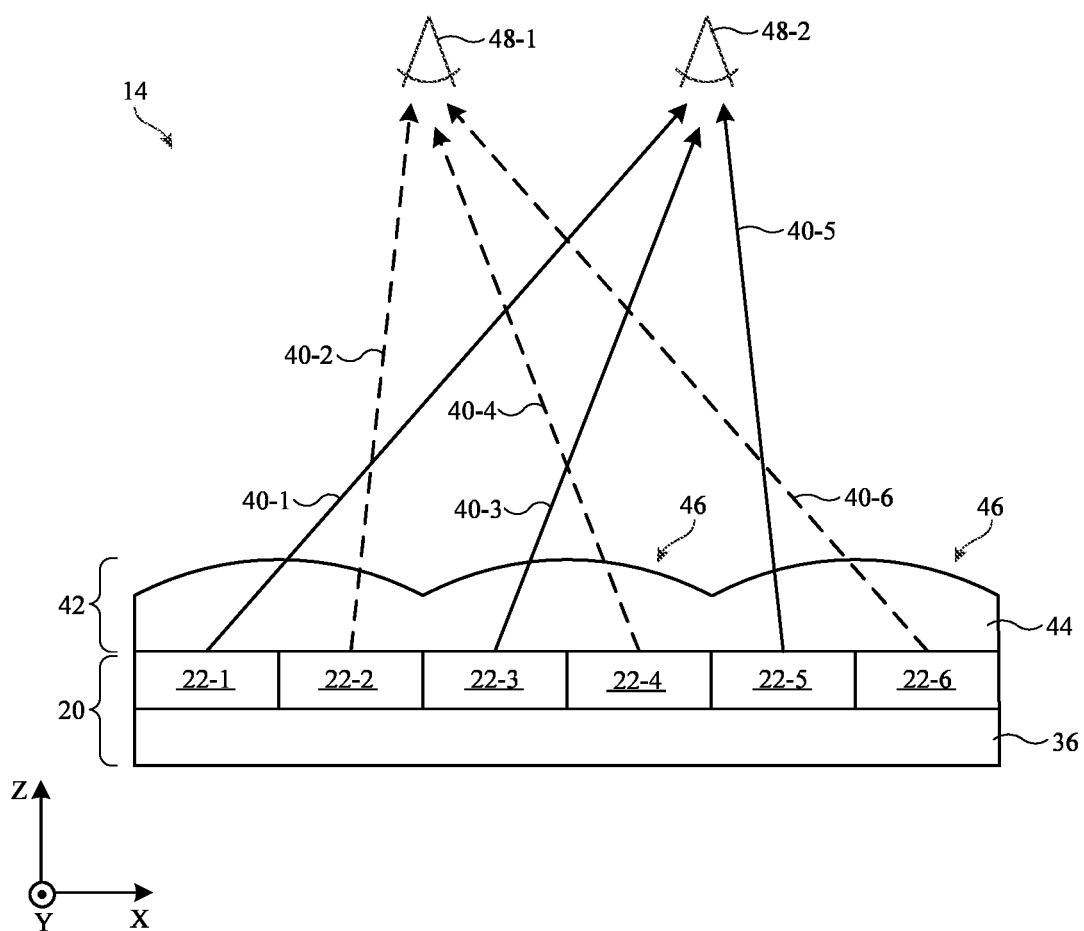
FIG. 3 is a cross-sectional side view of an illustrative lenticular display that provides images to a viewer in accordance with some embodiments.

FIG. 3 is a cross-sectional side view of an illustrative lenticular display that may be incorporated into electronic device 10. Display 14 includes a display panel 20 with pixels 22 on substrate 36. Substrate 36 may be formed from glass, metal, plastic, ceramic, or other substrate materials and pixels 22 may be organic light-emitting diode pixels, liquid crystal display pixels, or any other desired type of pixels.

As shown in FIG. 3, lenticular lens film 42 (sometimes referred to as stereoscopic lens film 42 or lens film 42) may be formed over the display pixels. Lenticular lens film 42 (sometimes referred to as a light redirecting film, a lens film, etc.) includes lenses 46 and a base film portion 44 (e.g., a planar film portion to which lenses 46 are attached). Lenses 46 may be lenticular lenses that extend along respective longitudinal axes (e.g., axes that extend into the page parallel to the Y-axis). Lenses 46 may be referred to as lenticular elements 46, lenticular lenses 46, optical elements 46, etc.

The lenses 46 of the lenticular lens film cover the pixels of display 14. An example is shown in FIG. 3 with display pixels 22-1, 22-2, 22-3, 22-4, 22-5, and 22-6. In this example, display pixels 22-1 and 22-2 are covered by a first lenticular lens 46, display pixels 22-3 and 22-4 are covered by a second lenticular lens 46, and display pixels 22-5 and 22-6 are covered by a third lenticular lens 46. The lenticular lenses may redirect light from the display pixels to enable stereoscopic viewing of the display.

Consider the example of display 14 being viewed by a viewer with a first eye (e.g., a right eye) 48-1 and a second eye (e.g., a left eye) 48-2. Light from pixel 22-1 is directed by the lenticular lens film in direction 40-1 towards left eye 48-2, light from pixel 22-2 is directed by the lenticular lens film in direction 40-2 towards right eye 48-1, light from pixel 22-3 is directed by the lenticular lens film in direction 40-3 towards left eye 48-2, light from pixel 22-4 is directed by the lenticular lens film in direction 40-4 towards right eye 48-1, light from pixel 22-5 is directed by the lenticular lens film in direction 40-5 towards left eye 48-2, light from pixel 22-6 is directed by the lenticular lens film in direction 40-6 towards right eye 48-1. In this way, the viewer's right eye 48-1 receives images from pixels 22-2, 22-4, and 22-6, whereas left eye 48-2 receives images from pixels 22-1, 22-3, and 22-5. Pixels 22-2, 22-4, and 22-6 may be used to display a slightly different image than pixels 22-1, 22-3, and 22-5. Consequently, the viewer may perceive the received images as a single three-dimensional image.

Pixels of the same color may be covered by a respective lenticular lens 46. In one example, pixels 22-1 and 22-2 may be red pixels that emit red light, pixels 22-3 and 22-4 may be green pixels that emit green light, and pixels 22-5 and 22-6 may be blue pixels that emit blue light. This example is merely illustrative. In general, each lenticular lens may cover any desired number of pixels each having any desired color. The lenticular lens may cover a plurality of pixels having the same color, may cover a plurality of pixels each having different colors, may cover a plurality of pixels with some pixels being the same color and some pixels being different colors, etc.

Figure 4:
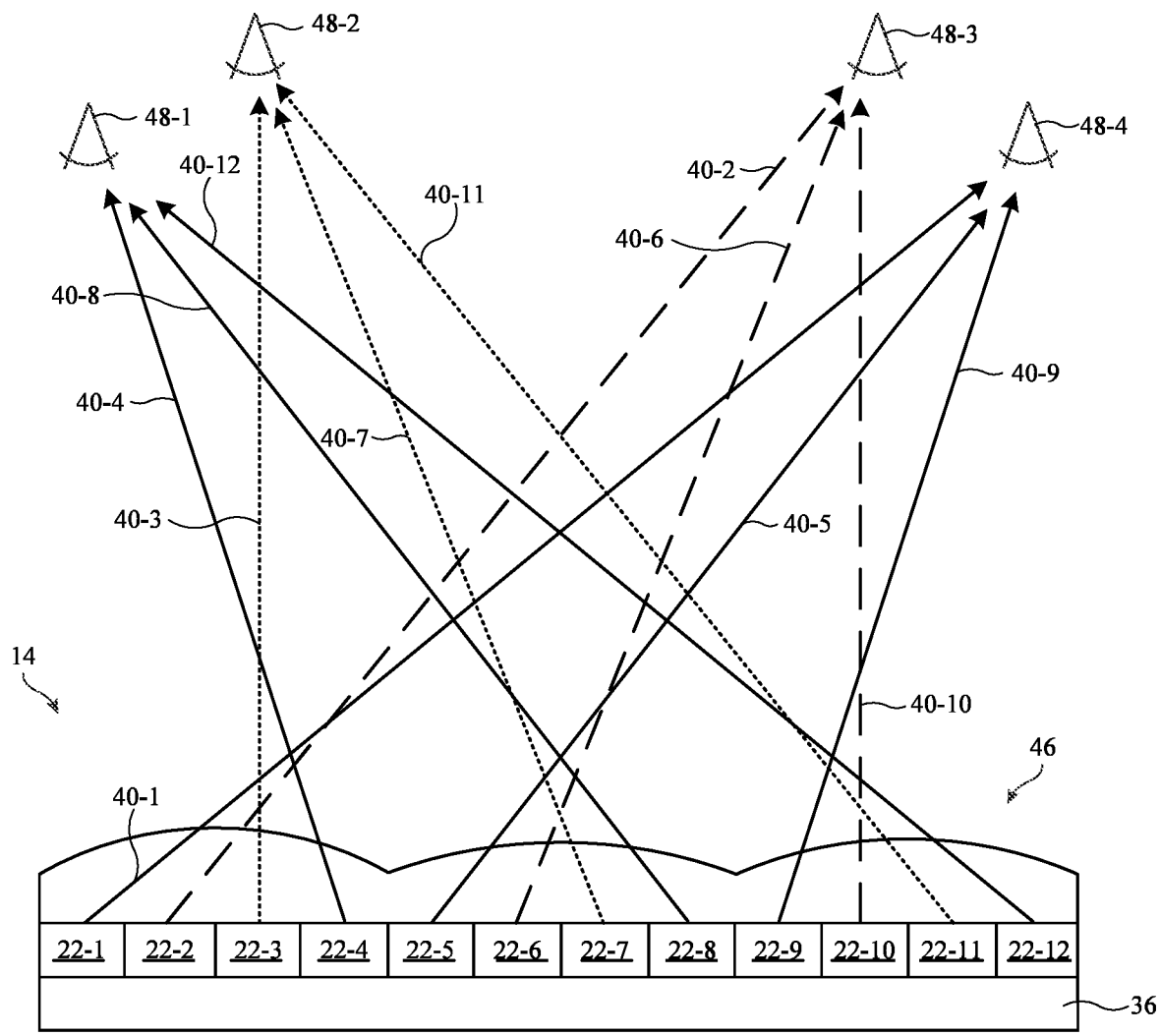
FIG. 4 is a cross-sectional side view of an illustrative lenticular display that provides images to two or more viewers in accordance with some embodiments.

FIG. 4 is a cross-sectional side view of an illustrative stereoscopic display showing how the stereoscopic display may be viewable by multiple viewers. The stereoscopic display of FIG. 3 may have one optimal viewing position (e.g., one viewing position where the images from the display are perceived as three-dimensional). The stereoscopic display of FIG. 4 may have two or more optimal viewing positions (e.g., two or more viewing positions where the images from the display are perceived as three-dimensional).

Display 14 may be viewed by both a first viewer with a right eye 48-1 and a left eye 48-2 and a second viewer with a right eye 48-3 and a left eye 48-4. Light from pixel 22-1 is directed by the lenticular lens film in direction 40-1 towards left eye 48-4, light from pixel 22-2 is directed by the lenticular lens film in direction 40-2 towards right eye 48-3, light from pixel 22-3 is directed by the lenticular lens film in direction 40-3 towards left eye 48-2, light from pixel 22-4 is directed by the lenticular lens film in direction 40-4 towards right eye 48-1, light from pixel 22-5 is directed by the lenticular lens film in direction 40-5 towards left eye 48-4, light from pixel 22-6 is directed by the lenticular lens film in direction 40-6 towards right eye 48-3, light from pixel 22-7 is directed by the lenticular lens film in direction 40-7 towards left eye 48-2, light from pixel 22-8 is directed by the lenticular lens film in direction 40-8 towards right eye 48-1, light from pixel 22-9 is directed by the lenticular lens film in direction 40-9 towards left eye 48-4, light from pixel 22-10 is directed by the lenticular lens film in direction 40-10 towards right eye 48-3, light from pixel 22-11 is directed by the lenticular lens film in direction 40-11 towards left eye 48-2, and light from pixel 22-12 is directed by the lenticular lens film in direction 40-12 towards right eye 48-1. In this way, the first viewer's right eye 48-1 receives images from pixels 22-4, 22-8, and 22-12, whereas left eye 48-2 receives images from pixels 22-3, 22-7, and 22-11. Pixels 22-4, 22-8, and 22-12 may be used to display a slightly different image than pixels 22-3, 22-7, and 22-11. Consequently, the first viewer may perceive the received images as a single three-dimensional image. Similarly, the second viewer's right eye 48-3 receives images from pixels 22-2, 22-6, and 22-10, whereas left eye 48-4 receives images from pixels 22-1, 22-5, and 22-9. Pixels 22-2, 22-6, and 22-10 may be used to display a slightly different image than pixels 22-1, 22-5, and 22-9. Consequently, the second viewer may perceive the received images as a single three-dimensional image.

Pixels of the same color may be covered by a respective lenticular lens 46. In one example, pixels 22-1, 22-2, 22-3, and 22-4 may be red pixels that emit red light, pixels 22-5, 22-6, 22-7, and 22-8 may be green pixels that emit green light, and pixels 22-9, 22-10, 22-11, and 22-12 may be blue pixels that emit blue light. This example is merely illustrative. The display may be used to present the same three-dimensional image to both viewers or may present different three-dimensional images to different viewers. In some cases, control circuitry in the electronic device 10 may use eye and/or head tracking system 18 to track the position of one or more viewers and display images on the display based on the detected position of the one or more viewers.

It should be understood that the lenticular lens shapes and directional arrows of FIGS. 3 and 4 are merely illustrative. The actual rays of light from each pixel may follow more complicated paths (e.g., with redirection occurring due to refraction, total internal reflection, etc.). Additionally, light from each pixel may be emitted over a range of angles. The lenticular display may also have lenticular lenses of any desired shape or shapes. Each lenticular lens may have a width that covers two pixels, three pixels, four pixels, more than four pixels, more than ten pixels, etc. Each lenticular lens may have a length that extends across the entire display (e.g., parallel to columns of pixels in the display).

Figure 5:
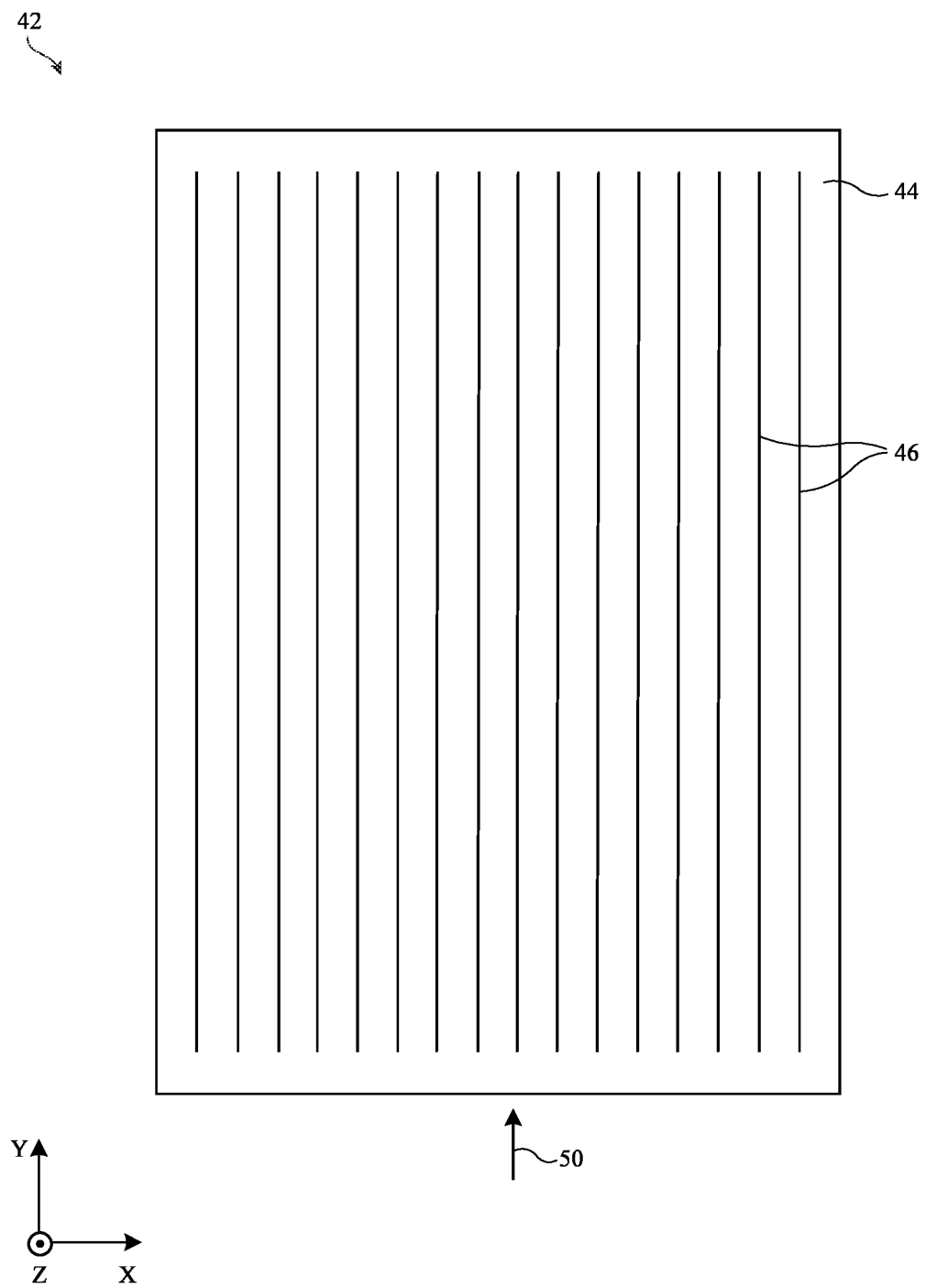
FIG. 5 is a top view of an illustrative lenticular lens film showing the elongated shape of the lenticular lenses in accordance with some embodiments.

FIG. 5 is a top view of an illustrative lenticular lens film that may be incorporated into a lenticular display. As shown in FIG. 5, elongated lenses 46 extend across the display parallel to the Y-axis. For example, the cross-sectional side view of FIGS. 3 and 4 may be taken looking in direction 50. The lenticular display may include any desired number of lenticular lenses 46 (e.g., more than 10, more than 100, more than 1,000, more than 10,000, etc.). In FIG. 5, the lenticular lenses extend perpendicular to the upper and lower edge of the display panel. This arrangement is merely illustrative, and the lenticular lenses may instead extend at a non-zero, non-perpendicular angle (e.g., diagonally) relative to the display panel if desired. With the arrangement of FIG. 5, the lenticular lenses split the display into distinct viewing zones along the X-axis.

The X-axis may be considered the horizontal axis for the display whereas the Y-axis may be considered the vertical axis for the display. As shown in FIG. 3, for example, the display may be oriented such that the user's eyes are located in the XY-plane with an offset between the eyes along the X-axis (e.g., in the horizontal direction). In other words, the left and right eye of the user have the same vertical position but different horizontal positions when viewing the display. Accordingly, lenticular lenses in FIG. 5 split the display into viewing zones along the X-axis such that each eye may view a different image from the display.

Figure 6:
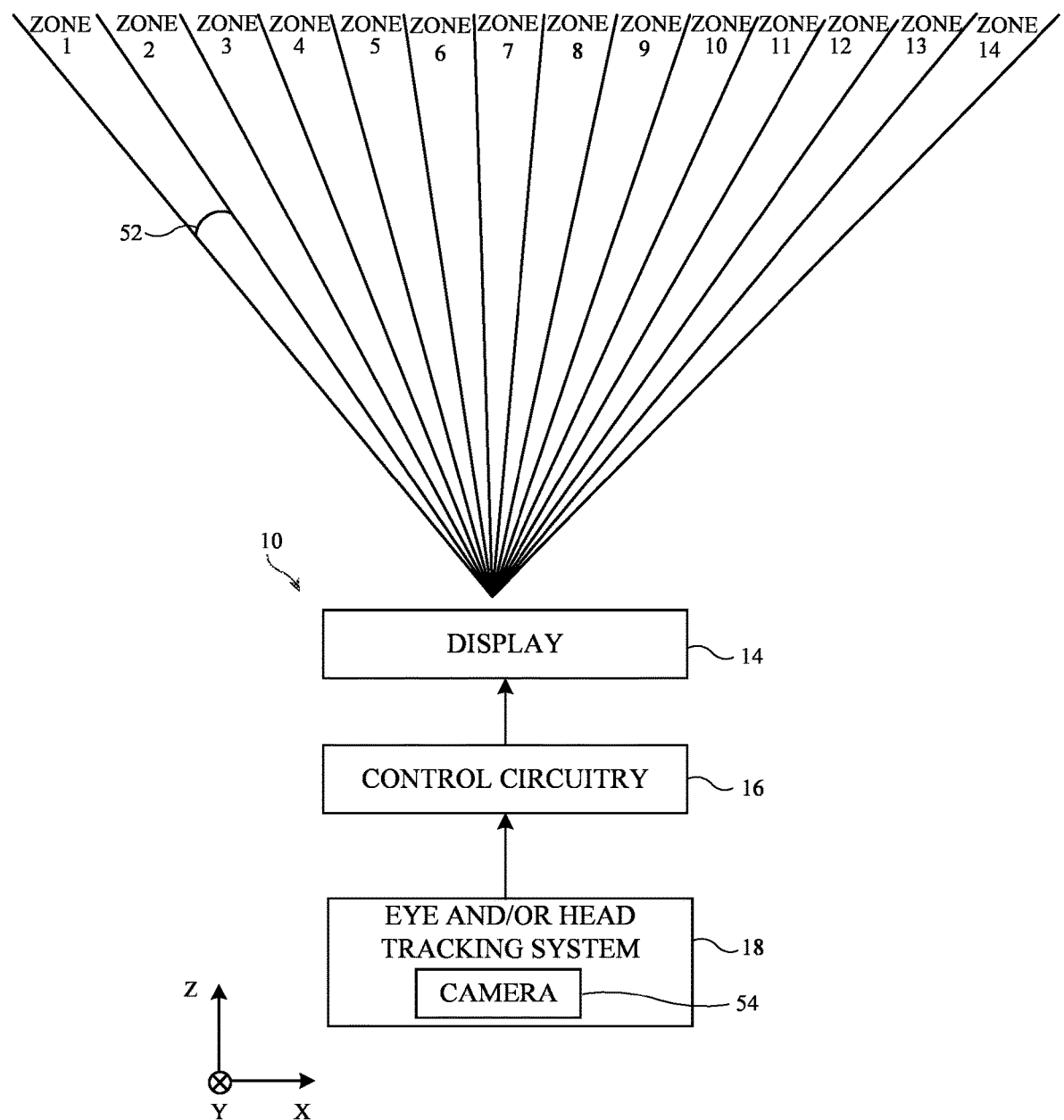
FIG. 6 is a diagram of an illustrative display that includes an eye and/or head tracking system that determines viewer eye position and control circuitry that updates the display based on the viewer eye position in accordance with some embodiments.

FIG. 6 is a schematic diagram of an illustrative electronic device showing how information from eye and/or head tracking system 18 may be used to control operation of the display. As shown in FIG. 6, display 14 is capable of providing unique images across a number of distinct zones. In FIG. 6, display 14 emits light across 14 zones, each having a respective angle of view 52 along the X-axis. The angle 52 may be between 1° and 2°, between 0° and 4°, less than 5°, less than 3°, less than 2°, less than 1.5°, greater than 0.5°, or any other desired angle. Each zone may have the same associated viewing angle or different zones may have different associated viewing angles.

The example herein of the display having 14 independently controllable zones is merely illustrative. In general, the display may have any desired number of independently controllable zones (e.g., more than 2, more than 6, more than 10, more than 12, more than 16, more than 20, more than 30, more than 40, less than 40, between 10 and 30, between 12 and 25, etc.).

Each zone is capable of displaying a unique image to the viewer. The sub-pixels on display 14 may be divided into groups, with each group of sub-pixels capable of displaying an image for a particular zone. For example, a first subset of sub-pixels in display 14 is used to display an image (e.g., a two-dimensional image) for zone 1, a second subset of sub-pixels in display 14 is used to display an image for zone 2, a third subset of sub-pixels in display 14 is used to display an image for zone 3, etc. In other words, the sub-pixels in display 14 may be divided into 14 groups, with each group associated with a corresponding zone (sometimes referred to as viewing zone) and capable of displaying a unique image for that zone. The sub-pixel groups may also themselves be referred to as zones.

Control circuitry 16 may control display 14 to display desired images in each viewing zone. There is much flexibility in how the display provides images to the different viewing zones. Display 14 may display entirely different content in different zones of the display. For example, an image of a first object (e.g., a cube) is displayed for zone 1, an image of a second, different object (e.g., a pyramid) is displayed for zone 2, an image of a third, different object (e.g., a cylinder) is displayed for zone 3, etc. This type of scheme may be used to allow different viewers to view entirely different scenes from the same display. However, in practice there may be crosstalk between the viewing zones. As an example, content intended for zone 3 may not be contained entirely within viewing zone 3 and may leak into viewing zones 2 and 4.

Therefore, in another possible use-case, display 14 may display a similar image for each viewing zone, with slight adjustments for perspective between each zone. This may be referred to as displaying the same content at different perspectives, with one image corresponding to a unique perspective of the same content. For example, consider an example where the display is used to display a three-dimensional cube. The same content (e.g., the cube) may be displayed on all of the different zones in the display. However, the image of the cube provided to each viewing zone may account for the viewing angle associated with that particular zone. In zone 1, for example, the viewing cone may be at a −10° angle relative to the surface normal of the display (along the horizontal direction). Therefore, the image of the cube displayed for zone 1 may be from the perspective of a −10° angle relative to the surface normal of the cube (as in FIG. 7A). Zone 7, in contrast, is at approximately the surface normal of the display. Therefore, the image of the cube displayed for zone 7 may be from the perspective of a 0° angle relative to the surface normal of the cube (as in FIG. 7B). Zone 14 is at a 10° angle relative to the surface normal of the display (along the horizontal direction). Therefore, the image of the cube displayed for zone 14 may be from the perspective of a 10° angle relative to the surface normal of the cube (as in FIG. 7C). As a viewer progresses horizontally (e.g., in the positive X-direction) from zone 1 to zone 14 in order, the appearance of the cube gradually changes to simulate looking at a real-world object.

There are many possible variations for how display 14 displays content for the viewing zones. In general, each viewing zone may be provided with any desired image based on the application of the electronic device. Different zones may provide different images of the same content at different perspectives, different zones may provide different images of different content, etc.

In one possible scenario, display 14 may display images for all of the viewing zones at the same time. However, this requires emitting light with all of the sub-pixels in the display in order to generate images for each viewing zone. Simultaneously providing images for all of the viewing zones at the same time therefore may consume more power than is desired. To reduce power consumption in the display, one or more of the zones may be disabled based on information from the eye and/or head tracking system 18.

Eye and/or head tracking system 18 (sometimes referred to as viewer tracking system 18, head tracking system 18, or tracking system 18) may use one or more cameras such as camera 54 to capture images of the area in front of the display 14 where a viewer is expected to be present. The example of eye and/or head tracking system 18 including a camera 54 is merely illustrative. Eye and/or head tracking system may include a light detection and ranging (lidar) sensor, a time-of-flight (ToF) sensor, an accelerometer (e.g., to detect the orientation of electronic device 10), a camera, or a combination of two or more of these components. Including sensors such as a light detection and ranging (lidar) sensor, a time-of-flight (ToF) sensor, or an accelerometer may improve acquisition speeds when tracking eye/head position of the viewer. The tracking system may use information gathered by the sensors (e.g., sensor data) to identify a position of the viewer relative to the viewing zones. In other words, the tracking system may be used to determine which viewing zone(s) the viewer is occupying. Each eye of the user may be associated with a different viewing zone (in order to allow three-dimensional content to be perceived by the user from the display). Based on the captured images, tracking system 18 may identify a first viewing zone associated with a left eye of the viewer and a second viewing zone associated with a right eye of the viewer. Tracking system 18 may use one camera, two cameras, three cameras, more than three cameras, etc. to obtain information on the position of the viewer(s). The cameras in the tracking system may capture visible light and/or infrared light images.

Control circuitry 16 may use information from tracking system 18 to selectively disable unoccupied viewing zones. Disabling unoccupied viewing zones conserves power within the electronic device. Control circuitry 16 may receive various types of information from tracking system 18 regarding the position of the viewer. Control circuitry 16 may receive raw data from head tracking system 18 and process the data to determine the position of a viewer, may receive position coordinates from head tracking system 18, may receive an identification of one or more occupied viewing zones from head tracking system 18, etc. If head tracking system 18 includes processing circuitry configured to process data from the one or more cameras to determine the viewer position, this portion of the head tracking system may also be considered control circuitry (e.g., control circuitry 16). Control circuitry 16 may include a graphics processing unit (GPU) that generates image data to be displayed on display 14. The GPU may generate image data based on the viewer position information.

In general, electronic device 10 includes one or more cameras 54 for capturing images of an environment around the display (e.g., an area in front of the display where viewers are expected to be located). Control circuitry (e.g., control circuitry 16) within the electronic device uses the images from the one or more cameras to identify which viewing zones are occupied by the viewer. The control circuitry then controls the display accordingly based on the occupied viewing zones. The control circuitry may include hard disk drive storage, nonvolatile memory, microprocessors, microcontrollers, digital signal processors, baseband processors, power management units, and/or application specific integrated circuits.

Figure 8A:
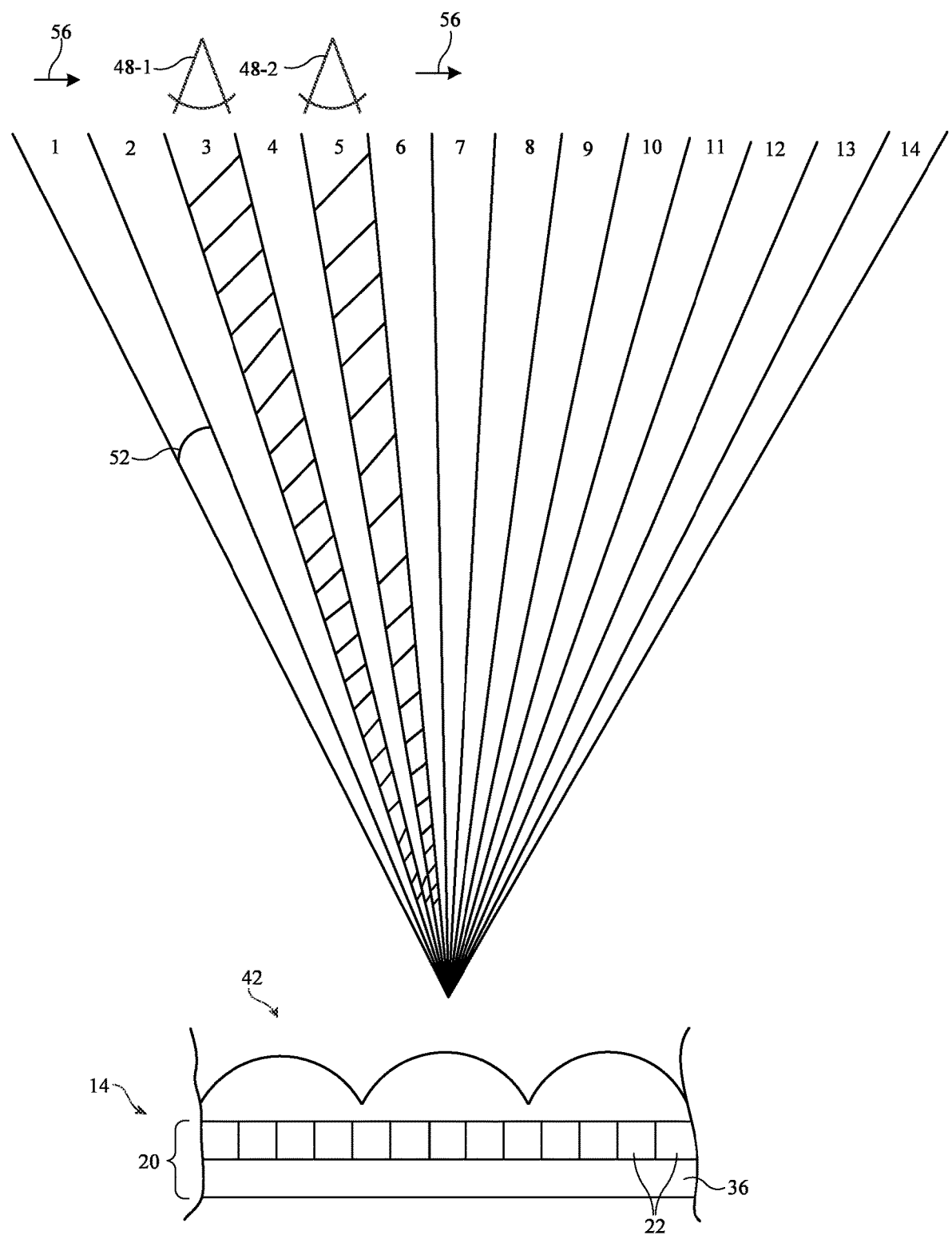
FIGS. 8A and 8B are side views of an illustrative display showing how viewing zones may be enabled and disabled based on viewer eye position information in accordance with some embodiments.
Figure 8B:
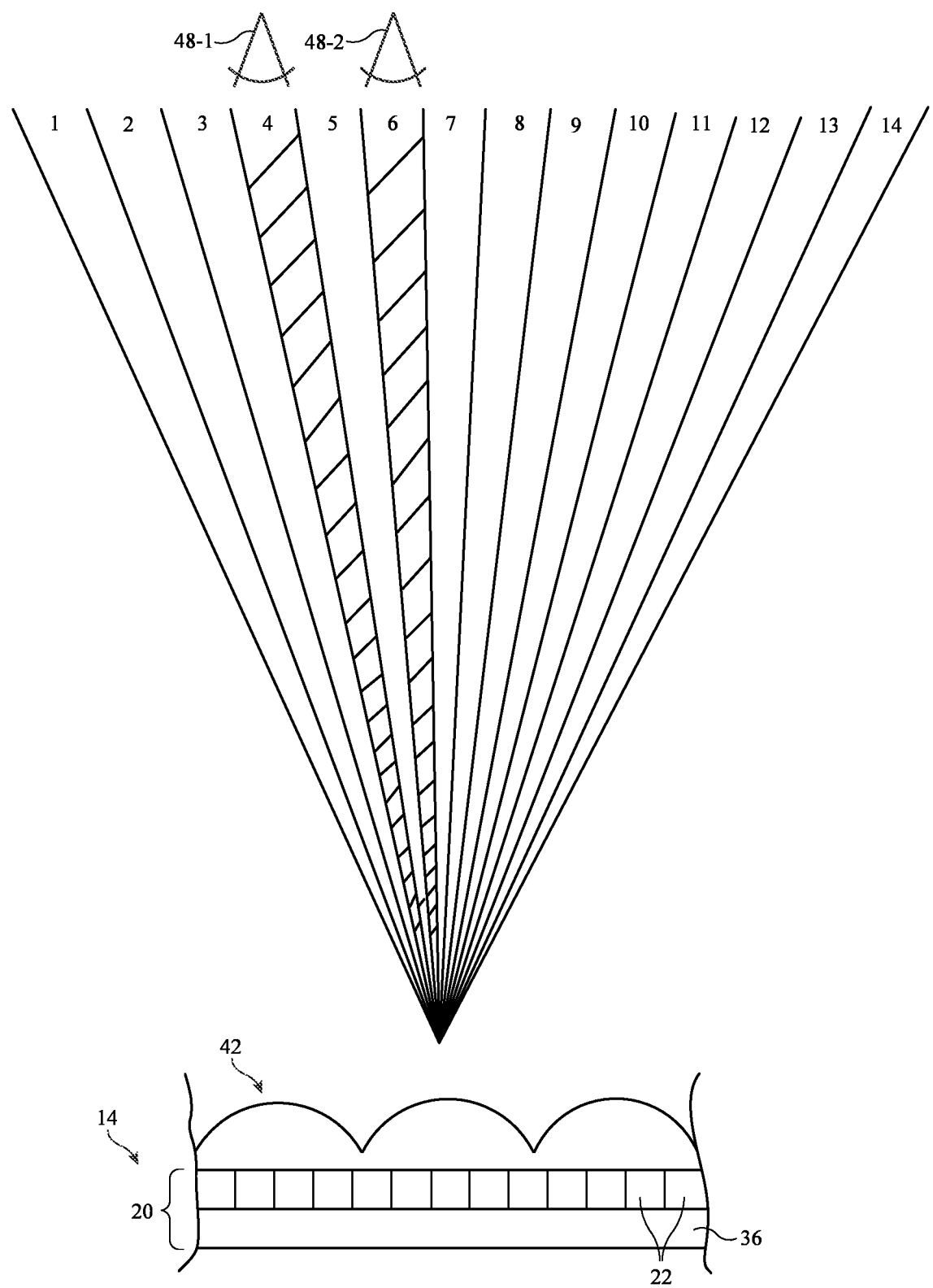

FIGS. 8A and 8B are diagrams illustrating how viewing zones may be disabled to reduce power consumption in the electronic device. As shown in FIG. 8A, display 14 is being viewed by a viewer with a first eye (e.g., a right eye) 48-1 and a second eye (e.g., a left eye) 48-2. The first eye 48-1 is in viewing zone 3 whereas the second eye is present in viewing zone 5.

A camera in head tracking system 18 may capture an image of the viewer and identify the location of eyes 48-1 and 48-2. Accordingly, control circuitry in the electronic device may determine that the user's eyes are present in viewing zones 3 and 5. In response, the control circuitry controls display 14 to display the desired images in viewing zones 3 and 5. However, the other viewing zones (e.g., zones 1, 2, 4, and 6-14) are disabled. In other words, the sub-pixels of the other zones are turned off so that they do not emit light and do not consume power. This saves power consumption within the electronic device while providing a satisfactory user experience with the active zones 3 and 5. The zones where light is emitted (e.g., zones 3 and 5 in FIG. 8A) may sometimes be referred to as active zones, enabled zones, zones that are 'on', or lit zones. The zones where light is not emitted (e.g., zones 1, 2, 4, and 6-14 in FIG. 8A) may sometimes be referred to as inactive zones, disabled zones, zones that are 'off', or unlit zones.

The active zones may be updated based on the real-time position of the viewer. For example, the viewer may shift horizontally in direction 56 as shown in FIG. 8A. After shifting positions, the viewer may end up in the position shown in FIG. 8B. Eye 48-1 is now aligned with zone 4 and eye 48-2 is now aligned with zone 6. Tracking system 18 may identify this shift in position based on images captured of the viewer. In response to the position change, control circuitry 16 updates display 14 to turn on zones 4 and 6 and turn off the remaining zones (zones 1-3, 5, and 7-14), as shown in FIG. 8B. In this way, control circuitry 16 may continually update display 14 to activate only the zones where the viewer's eyes are present and disable the remaining zones.

Ideally, tracking system 18 would always quickly and accurately identify the position of the viewer. This information would then be used by the control circuitry to update the display in real time, such that the activated viewing zones always align with the viewer's eyes. In practice, however, there may be latency between a viewer changing position and the display being updated accordingly. If the user changes position quickly, they may move into an inactive zone and the display will appear dark (off) until the display updates. In other scenarios, due to a variety of possible factors the tracking system 18 may lose the position of the viewer in the scene. This is sometimes referred to as tracking loss. If tracking loss occurs, the viewer may shift position to a new viewing zone without being detected by the tracking system. This again may result in the viewer shifting to a position where the display appears to be dark (even though the display should be showing content to the user).

Figure 9A:
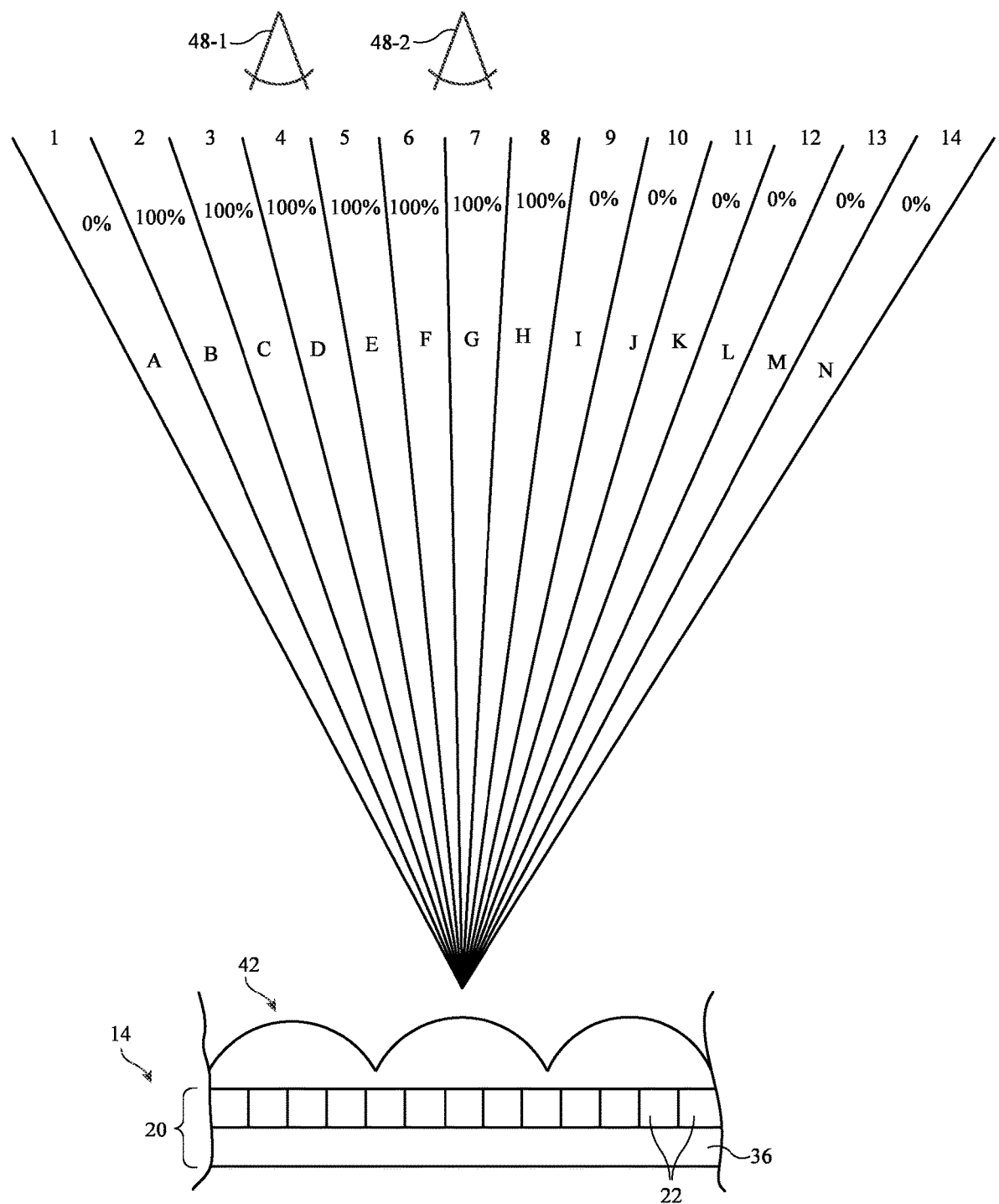
FIG. 9A is a side view of an illustrative display with unoccupied zones that have brightness levels that follow a step function in accordance with some embodiments.

To prevent visible artifacts caused by to latency and/or tracking loss, the display may emit light for viewing zones that are not occupied. FIG. 9A is a diagram showing a display emitting light at full brightness in several unoccupied viewing zones. In the example of FIG. 9A, eye 48-1 is in zone 4 and eye 48-2 is in zone 6. These zones therefore have full brightness (e.g., 100% brightness as indicated in FIG. 9A). However, some of the adjacent zones to zones 4 and 6 also have full brightness even though they are currently unoccupied by a viewer. As shown in FIG. 9A, zones, 2, 3, 5, 7, and 8 are enabled (e.g., operating at 100% brightness). Zones 1 and 9-14 remain disabled (e.g., turned off at 0% brightness).

The arrangement of FIG. 9A may mitigate visible artifacts for the viewer when the viewer shifts positions to adjacent viewing zones. For example, in FIG. 9A the viewer may shift to their right, resulting in eye 48-1 occupying viewing zone 3 and eye 48-2 occupying viewing zone 5. Due to tracking latency, electronic device 10 may not recognize and update display 14 based on this shift for some length of time. If zones 1-3, 5, and 7-14 are all turned off (e.g., as in FIG. 8B), the display appears dark for the viewer during the entirety of the latency time. With the scheme of FIG. 9A, however, the viewer still perceives the content on the display correctly during the latency time due to zones 3 and 5 already being at 100% brightness.

It should be noted that each zone may have a corresponding image. As shown in FIG. 9A, zone 1 displays image A, zone 2 displays image B, zone 3 displays image C, . . . , zone 14 displays image N. The image of each zone may be unique (e.g., tailored to the particular perspective associated with that viewing zone). In this example, the images A-N may all be associated with the same content (at unique perspectives). In this way, the viewer may shift position while the three-dimensional image appears as a stationary, real-life object. This example is merely illustrative and other images may be used for images A-N if desired.

Because zones 3 and 5 are displaying images C and E at full brightness, if the user shifts position to zones 3 and 5 they will immediately perceive the images C and E (which have the correct perspective for those positions) without waiting for the display to update. Therefore, the user may seamlessly transition between viewing zones without visible artifacts caused by latency, loss of viewer tracking capabilities, etc.

In FIG. 9A, the brightness of the viewing zones follows a step-function relative to the occupied viewing zones. In other words, each occupied viewing zone (zones 4 and 6 in FIG. 9A) has two adjacent viewing zones on either side that are also provided at full brightness. For example, zones 7 and 8 to the right of zone 6 are provided at full brightness and zones 2 and 3 to the left of zone 4 are provided at full brightness. Past these zones, however, the brightness drops to 0% (e.g., the zones are disabled). This example is merely illustrative. In another example, only one adjacent viewing zone on either side of the occupied viewing zone may operate at full brightness.

Figure 9B:
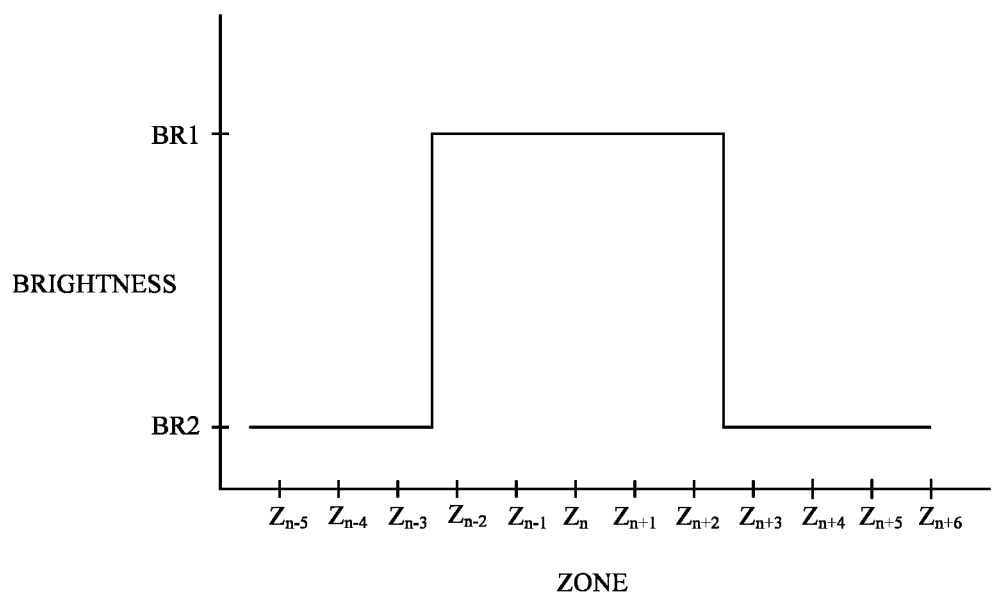
FIG. 9B is a graph of an illustrative step function that may be used to determine zone brightness levels in accordance with some embodiments.

FIG. 9B is a graph of an illustrative brightness profile that may be used for the display zones. As shown in FIG. 9B, there may be a zone $Z_n$ where the viewer's eye is located. Zones are present on either side of zone Zn (e.g., $Z_{n-1}$, $Z_{n-2}$, $Z_{n-3}$, $Z_{n+1}$, $Z_{n+2}$, $Z_{n+3}$, etc.). In FIG. 9B, the brightness at zone Z n is BR1. This may be 100% (e.g., the maximum brightness the display is capable of) or some other desired peak brightness (e.g., a brightness determined to be appropriate for the real time lighting conditions of the display). For example, in dim ambient light conditions BR1 may be less than the maximum brightness the display is capable of. BR1 may be referred to as a full brightness level.

In FIG. 9B, two zones adjacent to $Z_n$ have the same brightness as $Z_n$. Zones $Z_{n+1}$, $Z_{n+2}$, $Z_{n-1}$, and $Z_{n-2}$ all have the same brightness BR1 as $Z_n$. Past this point, however, the brightness drops to BR2 (e.g., 0% or off). As shown in FIG. 9B, zones that are 3 or more zones away from the zone including the viewer's eye may be operated at lower brightness level BR2.

Of course, the viewer's second eye may be present in a zone near the viewer's first eye. Unoccupied zones that are interposed between two eyes may have a brightness dictated by the dimming profile for the closer eye, may have the highest brightness of the two magnitudes associated with each respective eye's brightness profile, etc. The number of unoccupied zones between a user's eyes may depend upon the particular display design, the distance of the user from the display, etc. Therefore, for simplicity, the zone brightness profiles (as in FIG. 9B) are characterized relative to a single zone (e.g., Z n in FIG. 9B) associated with a single eye.

The specific characteristics of the brightness profile of FIG. 9B may be tuned based on the desired power consumption savings, viewer experience, and other factors associated with a particular electronic device design. In general, having more unoccupied zones enabled and having higher brightness levels within each unoccupied zone is optimal for a user's viewing experience (as artifacts will be minimal even if there is latency or tracking loss). Having fewer unoccupied zones enabled and having lower brightness levels within each unoccupied zone is optimal for reducing power consumption. These tradeoffs may be balanced for each design, may be adjusted by a user of the electronic device, may be adjusted based on other factors (e.g., ambient light conditions), etc.

In other words, the number of adjacent zones on either side of Z n in FIG. 9B at brightness BR1 may be 0, 1, 2 (as in FIG. 9B), 3, 4, more than 4, more than 2, between 1 and 5, etc. The brightness level BR1 may be 100% or less than 100%. Brightness level BR2 may be 0% or greater than 0%.

In the step function of FIG. 9B, zones are placed in one of two states (e.g., the on state at 100% brightness or the off state at 0% brightness). This example is merely illustrative. In another possible brightness scheme, the brightness may be gradually lowered in unoccupied zones adjacent to the occupied zones. The further away an unoccupied zone is from an occupied zone, the less likely it is that the viewer will reach that zone without the eye tracker identifying the shift in position and updating the display accordingly. Accordingly, having further away unoccupied zones at high brightness levels is less important than close unoccupied zones. The brightness levels of the unoccupied zones may therefore be decreased gradually with increasing distance from the occupied zones.

Figure 10A:
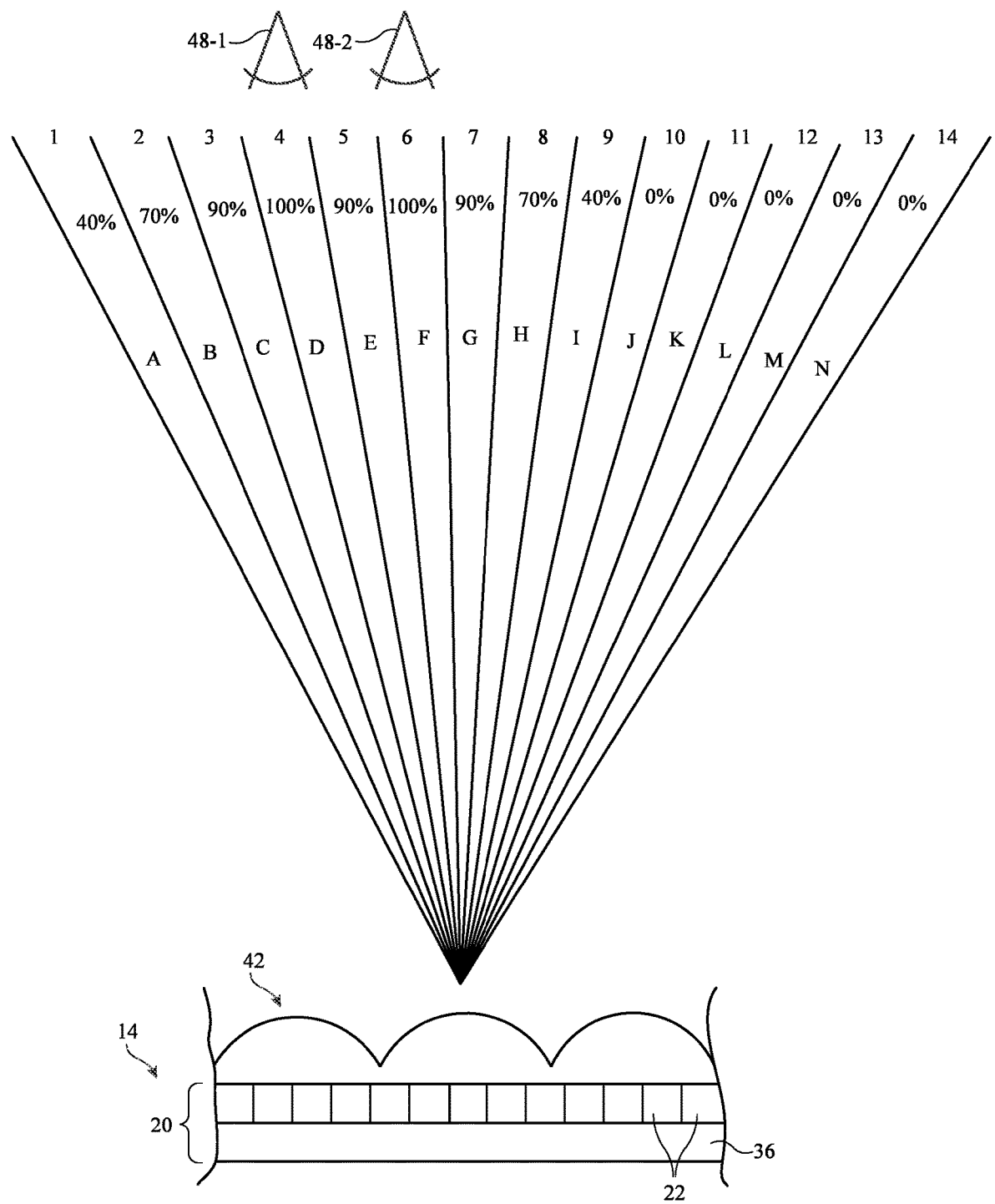
FIG. 10A is a side view of an illustrative display with unoccupied zones that have brightness levels that gradually decrease with increasing distance from the closest occupied zone in accordance with some embodiments.

As shown in FIG. 10A, eye 48-1 is in zone 4 and eye 48-2 is in zone 6. These zones therefore have full brightness (e.g., 100% brightness as indicated in FIG. 10A). With increasing distance from zone 6, the brightness level of the unoccupied zones drops. Zone 7 has a brightness level of 90%, zone 8 has a brightness level of 70%, and zone 9 has a brightness level of 40%. Further than zone 9 (e.g., zones 10-14), the unoccupied zones have a brightness level of 0%. The same brightness distribution is used adjacent to occupied zone 4 as well. Zone 3 has a brightness level of 90%, zone 2 has a brightness level of 70%, and zone 1 has a brightness level of 40%.

Figure 10B:
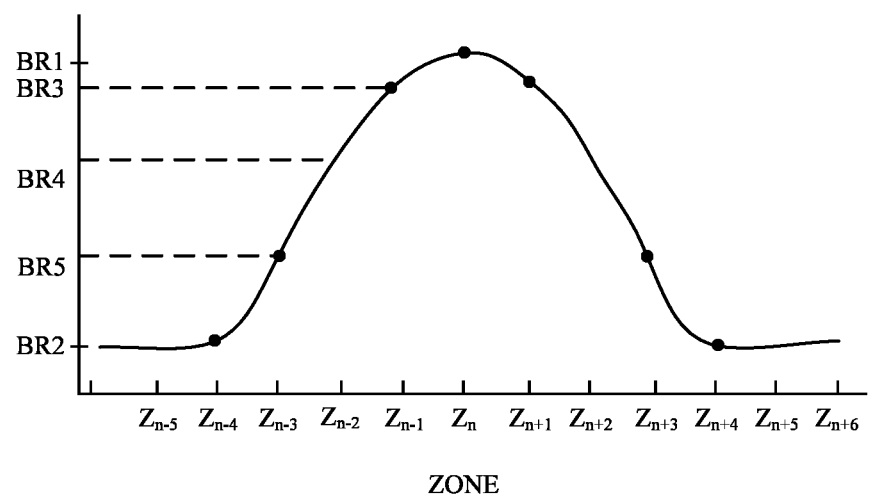
FIG. 10B is a graph of an illustrative gaussian function that may be used to determine zone brightness levels in accordance with some embodiments.

FIG. 10B is a graph of an illustrative brightness profile that may be used for the display zones. As shown in FIG. 10B, there may be a zone $Z_n$ where the viewer's eye is located. Zones are present on either side of zone Zn (e.g., $Z_{n-1}$, $Z_{n-2}$, $Z_{n-3}$, $Z_{n+1}$, $Z_{n+2}$, $Z_{n+3}$, etc.). In FIG. 10B, the brightness at zone Z n is BR1. This may be 100% (e.g., the maximum brightness the display is capable of) or some other desired peak brightness (e.g., a brightness determined to be appropriate for the real time lighting conditions of the display).

To either side of the occupied zone $Z_n$, the brightness decreases with increasing distance from zone $Z_n$. As shown, a brightness level of BR3 may be used one zone from the occupied zone (e.g., zones $Z_{n-1}$ and $Z_{n+1}$), a brightness level of BR4 may be used two zones from the occupied zone (e.g., zones $Z_{n-2}$ and $Z_{n+2}$), a brightness level of BR5 may be used three zones from the occupied zone (e.g., zones $Z_{n-3}$ and $Z_{n+3}$), and a brightness level of BR2 may be used more than three zones from the occupied zone (e.g., zones $Z_{n-4}$ and $Z_{n+4}$). In FIG. 10A, BR1 is 100%, BR2 is 0%, BR3 is 90%, BR4 is 70%, and BR5 is 40%.

This example is merely illustrative. Brightness levels BR1-BR5 may have any desired magnitudes. The brightness level BR1 may be 100% or less than 100%. Brightness level BR2 may be 0% or greater than 0%. In general, the brightness level may gradually decrease with increasing distance from the closest occupied zone. The brightness level may decrease monotonically with increasing distance from the closet occupied zone (as in FIG. 10B). At least one intermediate brightness level may be used between the peak brightness level (of the occupied zone) and the minimum brightness level (e.g., 0%). The brightness level may follow a profile having any desired shape (e.g., a gaussian profile).

Figure 11:
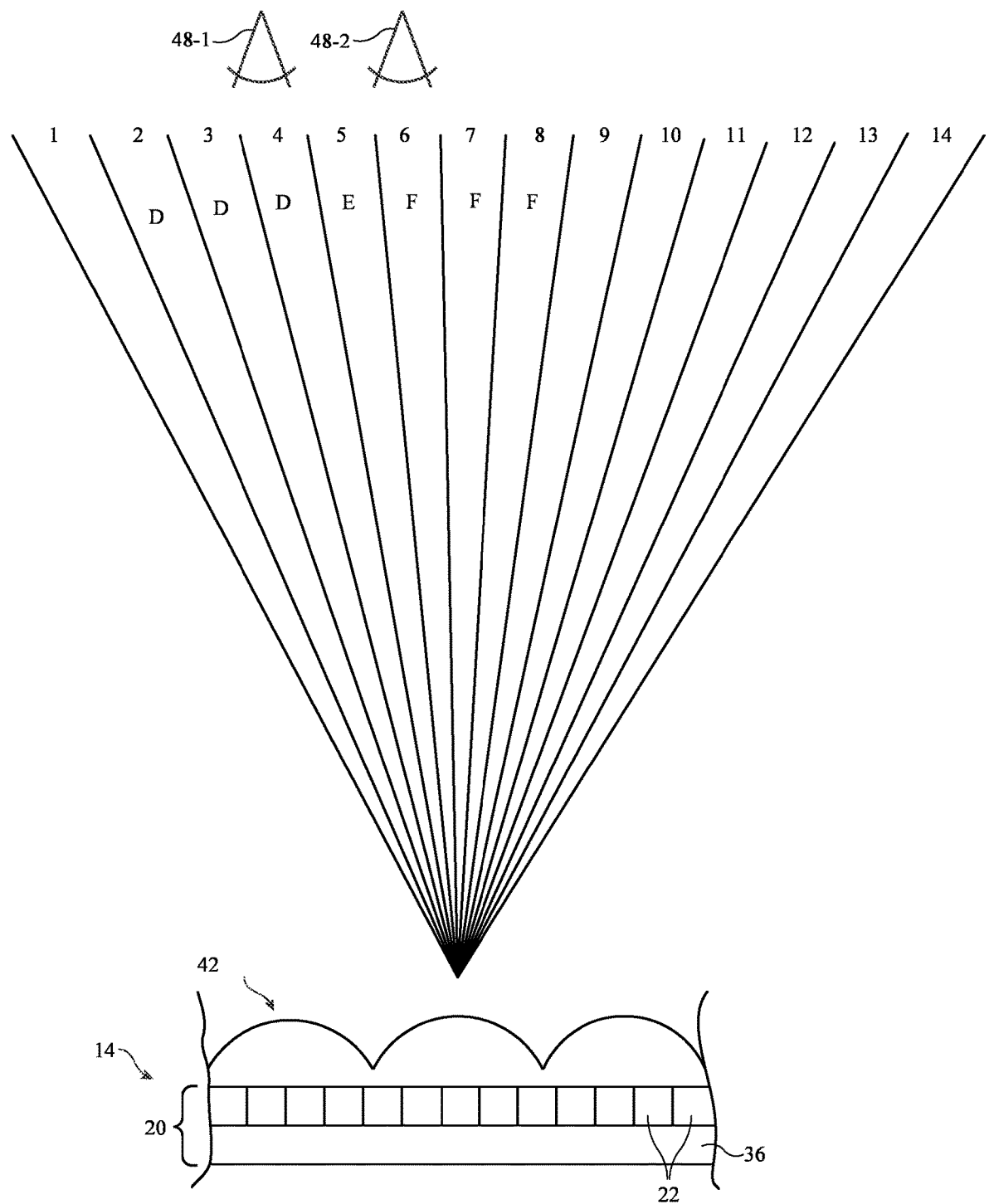
FIG. 11 is a side view of an illustrative display with images that are modified based on viewer eye position information in accordance with some embodiments.

In addition to using information from eye and/or head tracking system 18 to reduce power consumption, information from eye and/or head tracking system 18 may be used to increase sharpness in the display. FIG. 11 shows an arrangement of this type. In FIG. 11, similar to as shown in FIG. 10A, eye 48-1 is in zone 4 and eye 48-2 is in zone 6. Image D is presented in zone 4 and image F is presented in zone 6.

As previously mentioned, an image intended for a given viewing area may not be contained exclusively to that viewing zone. Crosstalk may occur between viewing zones within the display. To mitigate crosstalk, the images for unoccupied zones may be modified based on the viewer eye position. In FIG. 11, unoccupied zones 2 and 3 may display the same image as occupied zone 4 (image D). Consequently, if part of the zone 2 or zone 3 light leaks into zone 4, the light will correspond to the same image as in zone 4. This increases the perceived sharpness of the display to the viewer. Also in FIG. 11, unoccupied zones 7 and 8 may display the same image as occupied zone 6 (image F). Consequently, if part of the zone 7 or zone 8 light leaks into zone 6, the light will correspond to the same image as in zone 6.

In FIG. 11, each of zones 2-8 may emit light with full brightness (e.g., 100% brightness) and each of zones 1 and 9-14 may be turned off (e.g., 0% brightness). The unoccupied zones therefore follow a brightness profile similar to the step function of FIGS. 9A and 9B. This example is merely illustrative. If desired, a gradual brightness reduction scheme similar to as shown in FIGS. 10A and 10B may be used in FIG. 11.

Figure 12:
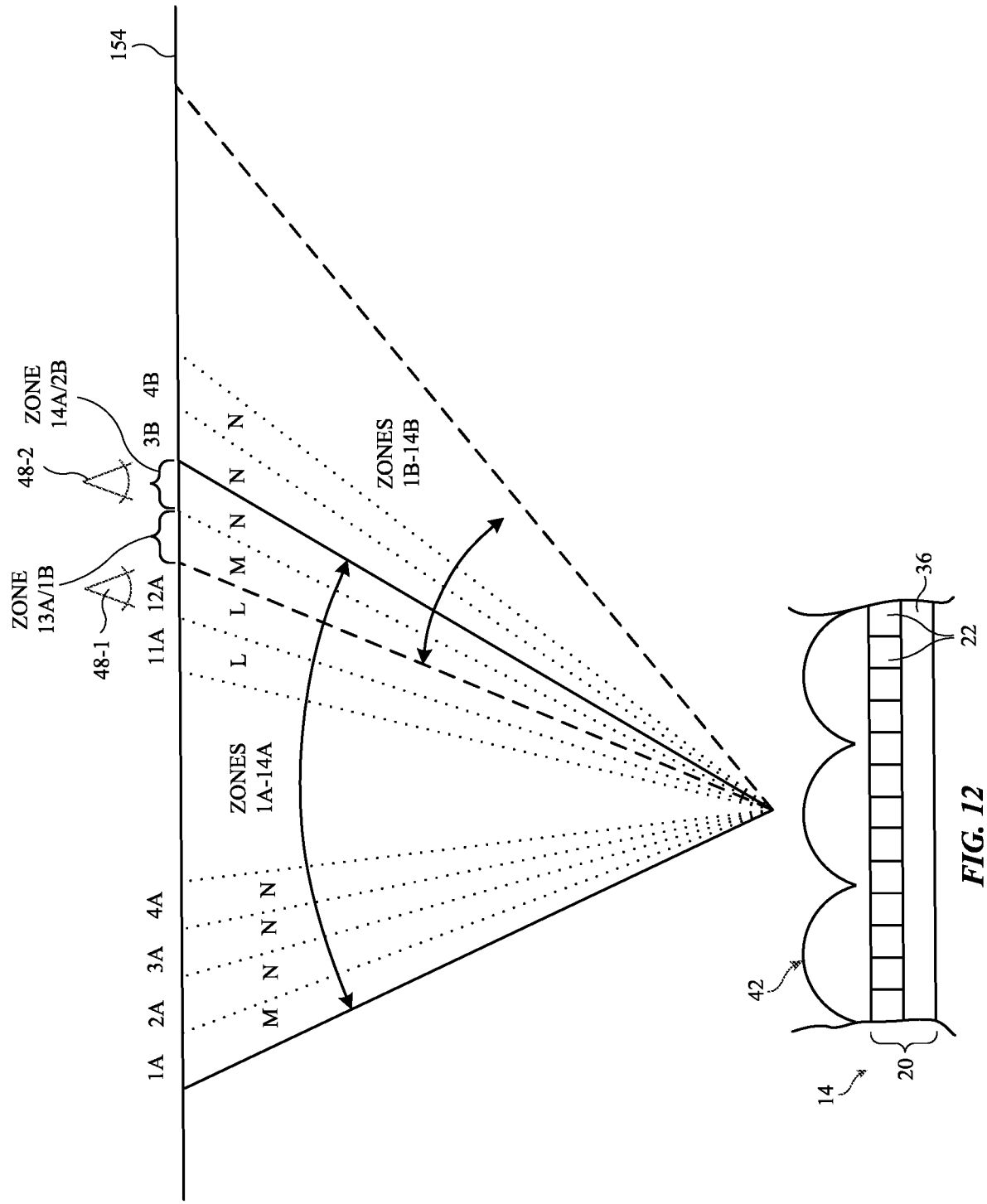
FIG. 12 is a side view of an illustrative display showing how a secondary viewing cone may be utilized based on viewer eye position information in accordance with some embodiments.

A similar concept as in FIG. 11 may be used to improve viewing at high viewing angles. FIG. 12 shows a display of this type. In FIGS. 6-11, display 14 is depicted as having fourteen distinct viewing zones that are each capable of displaying a respective unique image. Outside of the fourteen viewing zones, no additional viewing zones are shown. However, in some cases, a duplicate viewing zone may be present on one or both sides of the primary viewing zone.

For example, as shown in FIG. 12, there may be a primary viewing cone that includes zones 1A-14A. FIG. 12 shows an illustrative viewing plane 154. The center of the primary viewing cone is orthogonal to the surface of display 14. The viewing zones 1A-14A may be referred to as primary viewing zones. In addition, there may be a secondary viewing cone that is adjacent to the primary viewing cone and at an angle relative to the display. The secondary viewing cone includes zones 1B-14B. The viewing zones 1B-14B may be referred to as secondary viewing zones. Each secondary viewing zone is a duplicate of a primary viewing zone. For example, secondary viewing zone 1B displays the same image as primary viewing zone 1A, secondary viewing zone 2B displays the same image as primary viewing zone 2A, etc. The images displayed in the secondary viewing zones 1B-14B may be dimmer versions of the images displayed in primary viewing zones 1A-14A.

As shown in FIG. 12, the secondary viewing cone may at least partially overlap the primary viewing cone. Specifically, secondary viewing zone 1B overlaps with primary viewing zone 13A and secondary viewing zone 2B overlaps with primary viewing zone 14A. In some cases, this overlap may lead to undesirable cross-talk. However, using head tracking system 18, the known position of the viewer may be used to improve sharpness of the display.

In FIG. 12, eye 48-1 is in zone 12A and eye 48-2 is in zone 14A. Eye 48-1 may be intended to view image L from zone 12A and eye 48-2 may be intended to view image N from zone 14A. To improve sharpness, the adjacent, non-occupied zones may be modified to display the same image as the occupied zones. For example, zone 11A may display the same image as occupied zone 12A (image L). Consequently, if part of the zone 11A light leaks into zone 12A, the light will correspond to the same image as in zone 12A.

Zone 14A may display image N. Accordingly, zones 3A and 4A may also be used to display image N. This causes adjacent, non-occupied secondary zones 3B and 4B to display image N, improving the sharpness of the display. Similarly, zone 2A may be used to display image N. The secondary zone 2B that is a duplicate of zone 2A overlaps primary zone 14A. Displaying image N in zone 2A therefore ensures that image N is also displayed in zone 2B (which overlaps primary zone 14A also displaying image N). If zone 2A displayed a different image (e.g., image B), then a combination of image N and image B would be perceived by eye 48-2, resulting in an unclear image.

To summarize, secondary viewing zones may be leveraged to improve the sharpness of the display when head tracking indicates the viewer is viewing from a high viewing angle as in FIG. 12.

The techniques described thus far ensure that an image on the display has a desired appearance as the viewer moves in the horizontal direction (e.g., between viewing zones). However, a viewer may also move in the vertical direction (e.g., along the Y-direction) while viewing display 14. If care is not taken, the viewer's movement in the vertical direction may cause undesired artifacts from vertical parallax mismatch.

Figure 13:
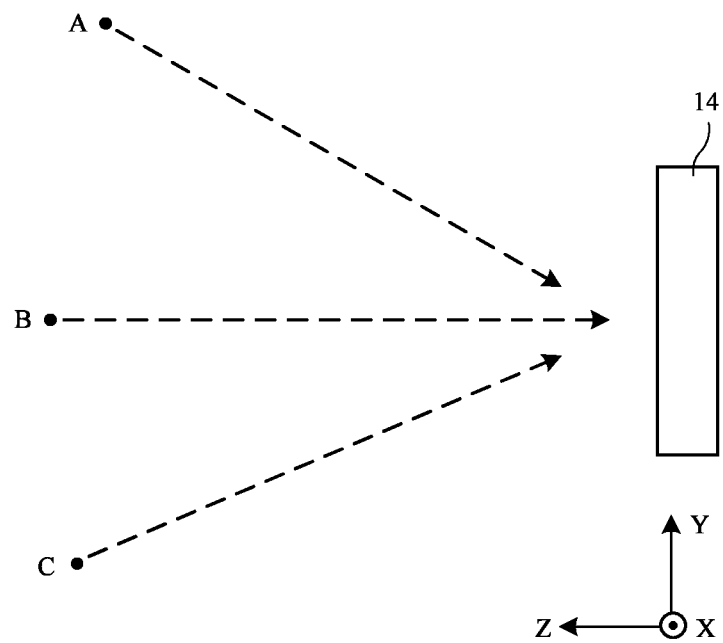
FIG. 13 is a side view of an illustrative display showing how a vertical viewing angle of the display may vary during operation in accordance with some embodiments.

In the diagram of FIG. 13, display 14 emits light in the positive Z-direction. The display may have viewing zones split along the X-axis (e.g., as shown in FIG. 6). A viewer may move in the vertical direction along the Y-axis (e.g., from position A to position B to position C). In this example, the viewer moves vertically while staying in the same position along the horizontal direction. Because the horizontal position of the viewer remains constant, the viewer will remain in the same viewing zones at positions A, B, and C. For example, the viewer's right eye may remain in viewing zone 3 at positions A, B, and C while the viewer's left eye may remain in viewing zone 5 at positions A, B, and C. Accordingly, the image perceived by the viewer will not change as the viewer moves between positions A, B, and C, despite the viewer moving vertically. This causes a vertical parallax mismatch for the viewer. A three-dimensional object displayed on the display will have the same appearance whether the viewer is viewing from an on-axis viewing angle (e.g., from position B that is parallel to the surface normal of display 14), a positive off-axis viewing angle (e.g., from position A that is higher than the display), or a negative off-axis viewing angle (e.g., from position C that is lower than the display).

As shown previously in connection with FIGS. 7A-7C, one application for the display is to present a three-dimensional image that accounts for the viewing angle of the viewer. As the viewer moves in the horizontal direction the image will account for the changing viewing angle. This simulates looking at a real-life three-dimensional object. However, because the image will remain the same as the viewer moves vertically, the appearance of the three-dimensional object does not account for the vertical viewing angle of the viewer. This may cause a vertical parallax mismatch, where the appearance of the three-dimensional object does not match for the actual vertical viewing angle of the viewer. The vertical parallax mismatch may be particularly noticeable at high off-axis viewing angles.

There are multiple ways to compensate the image on the display to correct for vertical parallax mismatch. The eye and/or head tracking system 18 may detect the relative position of the viewer in the vertical direction. Based on the relative position in the vertical direction, control circuitry 16 may update display 14 to compensate the display for the vertical position of the viewer.

One option for compensating the display is to dim the display as a function of the vertical position of the viewer. At an on-axis vertical viewing angle, the display may operate at full brightness. As the viewing angle in the vertical direction increases in the off-axis direction, however, the display may be dimmed by greater and greater amounts. This mitigates the negative aesthetic effect of the vertical parallax mismatch to the viewer. This dimming based on the vertical viewing angle may be performed instead of or in addition to the dimming based on the horizontal viewing zone position (as already shown and discussed in connection with FIGS. 9 and 10).

Another option for compensating the display is to update the content to account for the vertical position of the viewer. In other words, the image on the display is updated in real time based on the detected vertical position.

Figure 14:
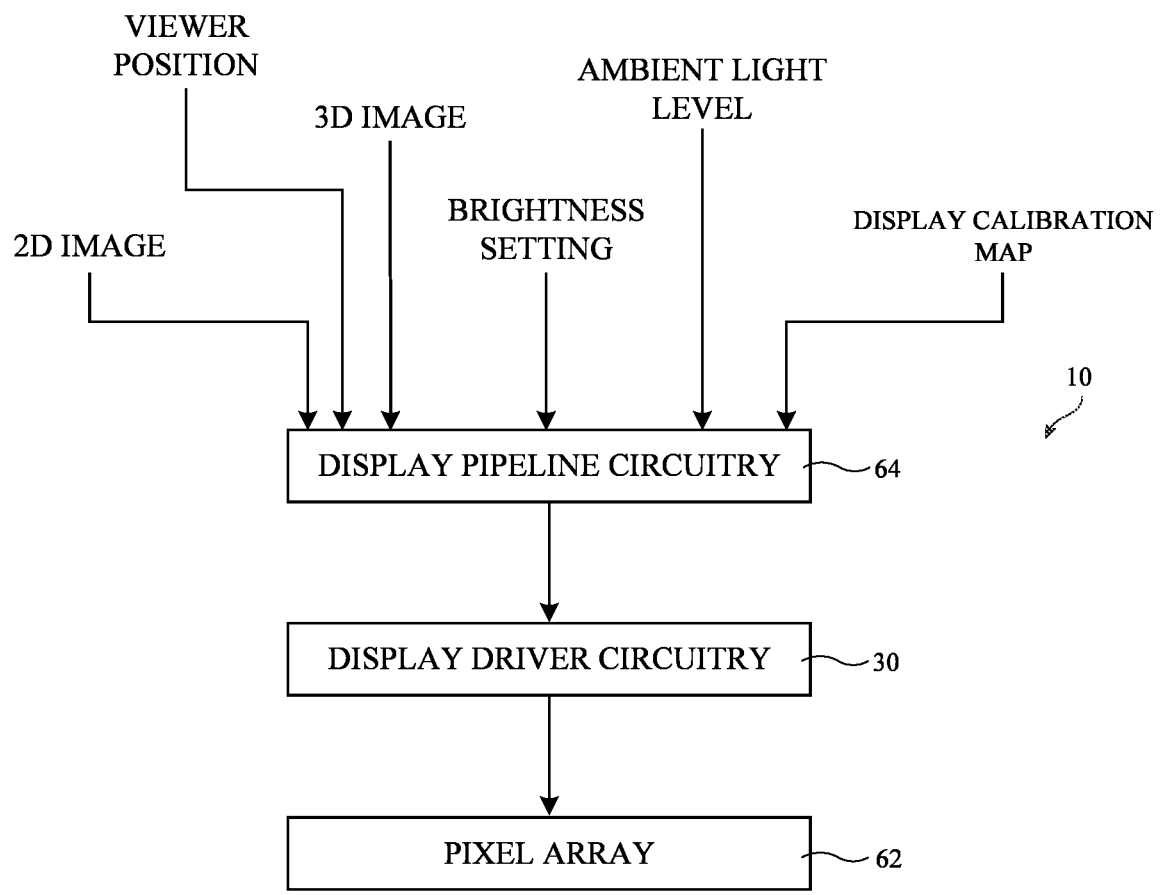
FIG. 14 is a diagram of an illustrative electronic device with display pipeline circuitry that generates images for a stereoscopic display in accordance with some embodiments.

FIG. 14 is a schematic diagram of an electronic device including display pipeline circuitry. The display pipeline circuitry 64 provides pixel data to display driver circuitry 30 for display on pixel array 62. Pipeline circuitry 64 may use various inputs to render an image and generate pixel brightness values for each pixel in the pixel array based on the image. In the example of FIG. 14, the display may be used to provide images of the same content at different perspectives in each viewing zone. In other words, each subset of the pixel array associated with a given viewing zone displays a different view of the same content. As a viewer changes viewing zones, the appearance of the content gradually changes to simulate looking at a real-world object.

There are numerous steps that may be involved in display pipeline circuitry 64 generating pixel data for the pixel array. First, the display pipeline circuitry may render content that is intended to be displayed by the three-dimensional display. The display pipeline circuitry may render a plurality of two-dimensional images of target content, with each two-dimensional image corresponding to a different view of the target content. In one example, the target content may be based on a two-dimensional (2D) image and a three-dimensional (3D) image. The two-dimensional image and the three-dimensional image may optionally be captured by a respective two-dimensional image sensor and three-dimensional image sensor in electronic device 10. This example is merely illustrative. The content may be rendered based on two-dimensional/three-dimensional images from other sources (e.g., from sensors on another device, computer-generated images, etc.). In some cases, the content may be rendered based on the viewer position detected by eye and/or head tracking system 18.

The two-dimensional images associated with different views may be compensated based on various factors. For example, the two-dimensional images associated with different views may be compensated based on a brightness setting for the device, ambient light levels, and/or a viewer position that is detected using eye tracking system 18. After the two-dimensional images of different views are compensated, the plurality of two-dimensional images may be combined and provided to the single pixel array 62. A view map (sometimes referred to as a display calibration map) may be used to determine which pixels in the pixel array correspond to each view (e.g., each of the plurality of two-dimensional images). Additional compensation steps may be performed after determining the pixel data for the entire pixel array. Once the additional compensation is complete, the pixel data may be provided to the display driver circuitry 30. The pixel data provided to display driver circuitry 30 includes a brightness level (e.g., voltage) for each pixel in pixel array 62. These brightness levels are used to simultaneously display a plurality of two-dimensional images on the pixel array, each two-dimensional image corresponding to a unique view of the target content that is displayed in a respective unique viewing zone.

Figure 15:
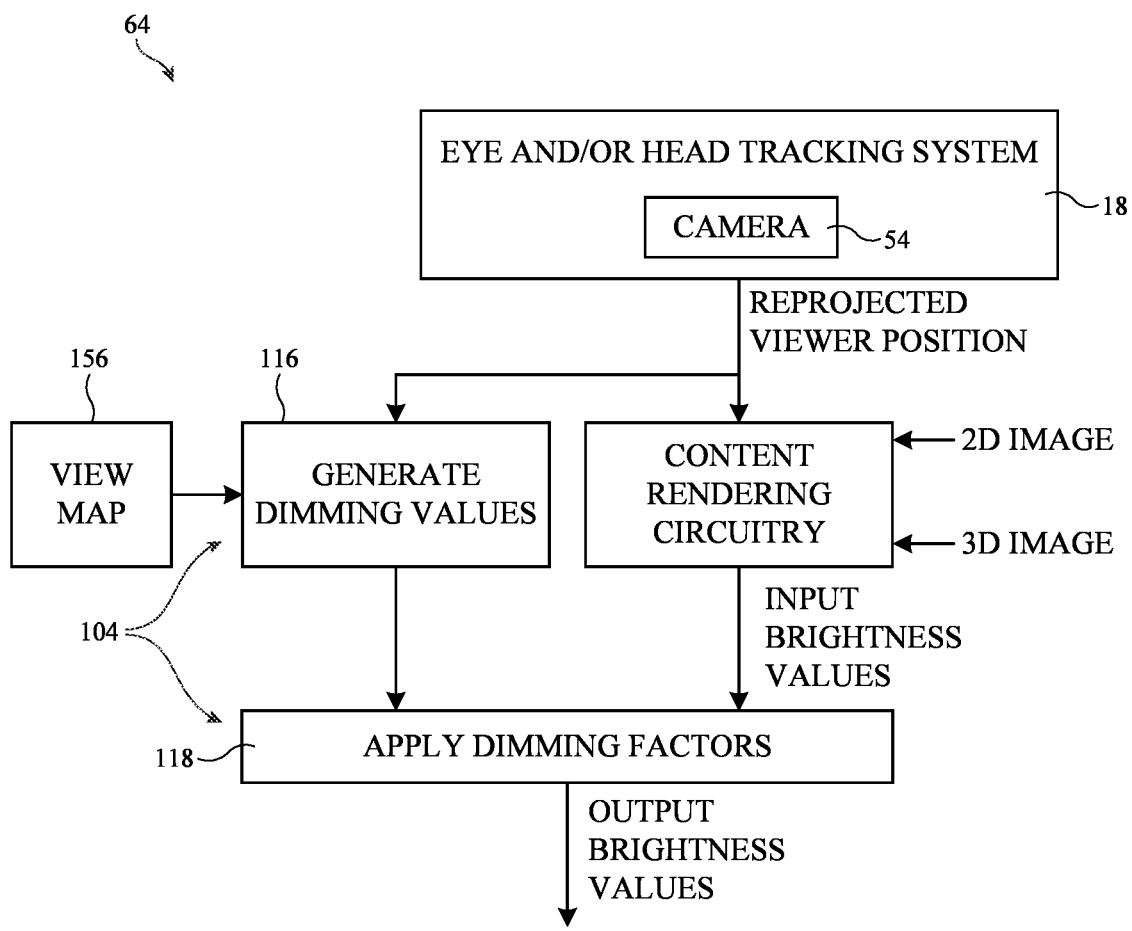
FIG. 15 is a diagram of illustrative display pipeline circuitry for a stereoscopic display that compensates for a vertical position of a viewer of the display in accordance with some embodiments.

As shown in FIG. 15, display pipeline circuitry 64 may include content rendering circuitry 102. Content rendering circuitry 102 may render a two-dimensional image for each respective viewing zone in the display. In the example of FIG. 6, the display has 14 viewing zones. In this example, content rendering circuitry 102 would render 14 two-dimensional images, with one two-dimensional image for each viewing zone. As previously discussed, there is flexibility in the type of content that is displayed in each of the viewing zones. However, herein an illustrative example will be described where the viewing zones are used to display images of the same content at different perspectives (views). In other words, each subset of the pixel array associated with a given viewing zone displays a different view of the same content. As a viewer changes viewing zones, the appearance of the content gradually changes to simulate looking at a real-world object. Each one of the plurality of views (e.g., two-dimensional images) rendered by circuitry 102 may include a respective target brightness value for each pixel in a target two-dimensional image.

The example of content rendering circuitry 102 rendering a two-dimensional image for each respective viewing zone in the display is merely illustrative. In general, content rendering circuitry 102 may render content using any desired techniques and/or in any desired format.

Content rendering circuitry 102 may render content for the plurality of views based on a two-dimensional image and a three-dimensional image. The two-dimensional image and three-dimensional image may be images of the same content. In other words, the two-dimensional image may provide color/brightness information for given content while the three-dimensional image provides a depth map associated with the given content. The two-dimensional image only has color/brightness information for one view of the given content. However, content rendering circuitry 102 may render two-dimensional images for additional views (at different perspectives) based on the depth map and the two-dimensional image from the original view. Content rendering circuitry 102 may render as many two-dimensional images (views) as there are viewing zones in the display (e.g., more than 1, more than 2, more than 6, more than 10, more than 12, more than 16, more than 20, more than 30, more than 40, less than 40, between 10 and 30, between 12 and 25, etc.).

Content rendering circuitry 102 may optionally include a machine learning model. The machine learning model may use additional information (e.g., additional images of the content) to render two-dimensional images (views) for each viewing zone in the display.

In some possible arrangements, content rendering circuitry 102 may receive viewer position information from eye and/or head tracking system 18. To mitigate vertical parallax mismatch in the display, content rendering circuitry 102 may render content that accounts for the viewer's position in the vertical direction. If the viewer is positioned such that they are viewing the display from an on-axis direction (e.g., position B in FIG. 13), the content may be rendered to have an appearance that matches the on-axis viewing direction. If the viewer is positioned such that they are viewing the display from a positive off-axis direction (e.g., position A in FIG. 13), the content may be rendered to have an appearance that matches the positive off-axis viewing direction. If the viewer is positioned such that they are viewing the display from a negative off-axis direction (e.g., position C in FIG. 13), the content may be rendered to have an appearance that matches the negative off-axis viewing direction.

As shown in FIG. 15, a reprojected viewer position may be used by content rendering circuitry 102 to render content that accounts for the viewer's position. The viewer position directly determined by eye and/or head tracking system 18 may be reprojected to a reprojected viewer position that accounts for changes in orientation of the device (e.g., yaw, roll, and pitch) and changes in the location of the electronic device (e.g., a coordinate within three-dimensional space that corresponds to a center of the electronic device). This improves the accuracy of the viewer position used by content rendering circuitry 102 and/or pixel dimming circuitry 104 when there is latency in eye and/or head tracking system 18 as the pose and/or location of device 10 changes.

Content rendering circuitry 102 may render a plurality of two-dimensional images that are each associated with a respective viewing zone. The two-dimensional images that are each associated with a respective viewing zone may be two-dimensional images of the same content at different horizontal perspectives and a single vertical perspective (that is based on the vertical eye position determined using eye tracking system 18). The single vertical perspective may be updated as the vertical eye position changes to provide the image with vertical parallax that matches the vertical eye position (e.g., real-time updates to match the vertical eye position).

Additional per-view processing circuitry (sometimes referred to as per-2D-image compensation circuitry) may be included in the device if desired. The per-view processing circuitry may individually process each two-dimensional image rendered by circuitry 102. The per-view processing circuitry is used to make content adjustments that are based on the perceived image that ultimately reaches the viewer (e.g., the pixels that are adjacent on the user's retina when viewing the display). As examples, the per-view processing circuitry may include one or more of tone mapping circuitry, ambient light adaptation circuitry, white point calibration circuitry, dithering circuitry, and/or any other desired processing circuitry. Panel-level processing circuitry may optionally be used to perform additional processing on the pixel data. Panel-level processing circuitry may include one or more of color compensation circuitry, border masking circuitry, burn-in compensation circuitry, and panel response correction circuitry. In contrast to the aforementioned per-view processing circuitry, panel-level processing circuitry may be used to make adjustments that are based on the pixels on the display panel (as opposed to perceived pixels at the user's eye).

After optional per-view processing is complete, the multiple 2D images from content rendering circuitry 102 may be provided to pixel mapping circuitry. The pixel mapping circuitry may receive all of the two-dimensional images that are produced by content rendering circuitry 102 and map the two-dimensional images to the pixels on display 14. The pixel mapping circuitry may output brightness values for each pixel in the display. In some cases, content rendering circuitry 102 may account for vertical parallax mismatch (and no additional dimming is performed). The compensation for vertical parallax mismatch (with or without dimming) is independent of pixel mapping performed by the pixel mapping circuitry. In other words, FIG. 15 shows one option for mitigating vertical parallax mismatch: by accounting for viewer position in the vertical direction during content rendering.

As previously discussed, pixel dimming may be used to control the brightness of the viewing zones in order to minimize power consumption, crosstalk, etc. This pixel dimming is based on the occupied viewing zones (and, accordingly, the viewer's position in the horizontal direction).

At step 116, the pixel dimming circuitry may generate dimming factors for each pixel based on the view number of each pixel (from a view map 156) as well as the reprojected viewer position received from eye tracking system 18. The view map 156 indicates how each view corresponds to the pixel array.

As one example, the dimming factors may be between (and including) 0 and 1 and may be multiplied by the original brightness value. For example, a dimming factor of 0 would mean that the input brightness value is dimmed to 0 (e.g., that pixel has a brightness of 0 and is effectively turned off) at step 118. A dimming factor of 1 would mean that the input brightness value is unchanged (e.g., that pixel is not dimmed). A dimming factor of 0.9 would mean that an output brightness value has a brightness that is 90% of its corresponding input brightness value. These examples of possible values for the dimming factors are merely illustrative. Any possible values may be used for the dimming factors. As another possible example, the dimming factors may be subtracted from the input pixel brightness values to dim the pixel brightness values. For example, the input pixel brightness values may be between (and including) 0 and 255. Consider, as an example, an input pixel brightness value of 200. A dimming factor of 0 would mean that the pixel is not dimmed (because no brightness reduction occurs, and the brightness remains 200). The dimming factor may be 60, resulting in the brightness value being reduced to 140 (e.g., 200-60=140). In general, any scheme may be used for the magnitudes and application of the dimming factors (e.g., $Brightness_{OUTPUT}=Brightness_{INPUT}-Dimming\ Factor$, $Brightness_{OUTPUT}=Brightness_{INPUT}\times Dimming\ Factor, etc.). The output brightness for a pixel may be a function of the input brightness for that pixel and the dimming factor for that pixel.

At step 118, the dimming factors may be applied to the input pixel brightness values (e.g., using a function as described above). For each pixel coordinate, the input brightness value for that coordinate is dimmed by the corresponding dimming factor determined for that coordinate in step 116. Depending on the type of dimming factor used, the dimming factor may be multiplied by the input brightness value, subtracted from the input brightness value, etc.

There are many factors that may influence the magnitude of the dimming factor determined at step 116. First, the horizontal position of the viewer may be used to determine the occupied viewing zone(s). The dimming factor for a pixel may depend on the position of the viewing zone relative to the view corresponding to that pixel. For example, unoccupied zones may be turned off (as in FIGS. 8A and 8B) or zone brightness levels may be modified based on viewer eye position to preserve power while avoiding latency artifacts (as in FIGS. 9A-10B).

In addition to or instead of the horizontal position of the viewer, the vertical position of the viewer may be used to determine to the dimming factor. Dimming based on the vertical position of the viewer may be used to mitigate the effect of vertical parallax mismatch in the display. As the viewer's viewing angle increases in an off-axis vertical direction, the dimming factor for the display may increase. The dimming factor based on vertical viewer position may be determined globally. In other words, every pixel in the display may receive the same dimming factor based on the vertical position of the viewer.

As an example, if the viewer is at a first position aligned with the surface normal of the display (e.g., position B in FIG. 13), the dimming factor may be 0. In other words, no dimming is applied to any of the pixels based on the vertical position and the display operates with full brightness. If the viewer moves to a second position with a viewing angle of 10 degrees off-axis, a second, non-zero dimming factor may be applied globally to the pixels to slightly dim the display. If the viewer moves to a third position with a viewing angle of 20 degrees off-axis, a third, non-zero dimming factor may be applied globally to the pixels to dim the display. The third dimming factor may be greater than the second dimming factor such that the display is dimmed by a greater amount when the viewer is at the third position than the second position. In other words, the magnitude of the dimming applied to the display may increase with increasing off-axis viewing angle in the vertical direction. The magnitude of dimming applied to the display is therefore proportional to the absolute value of the viewing angle in the vertical direction (e.g., the deviation of the viewing angle from the surface normal).

Figure 16A:
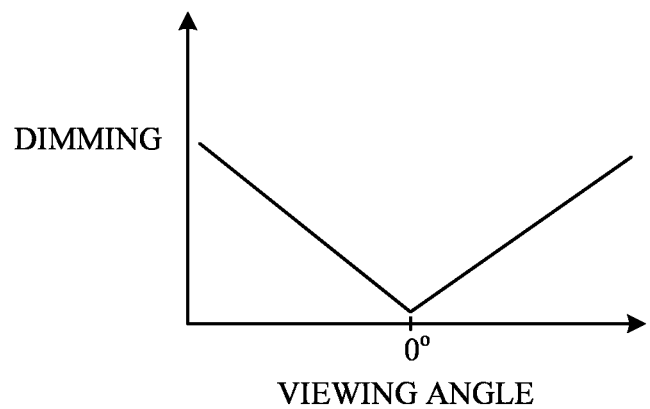
FIGS. 16A-16C are graphs showing illustrative dimming versus vertical viewing angle profiles that may be used to compensate for the vertical position of a viewer of a stereoscopic display in accordance with some embodiments.
Figure 16B:
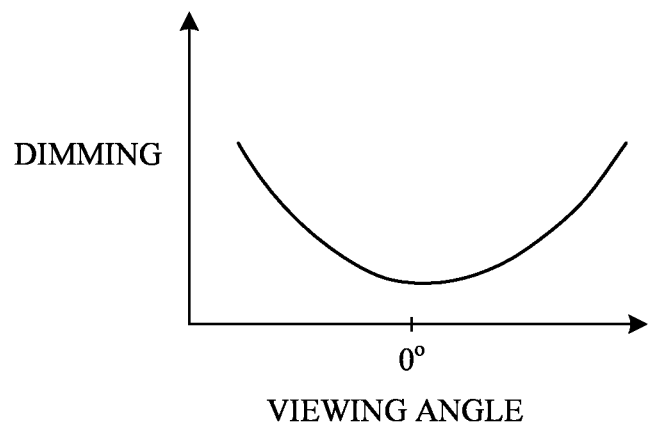
Figure 16C:
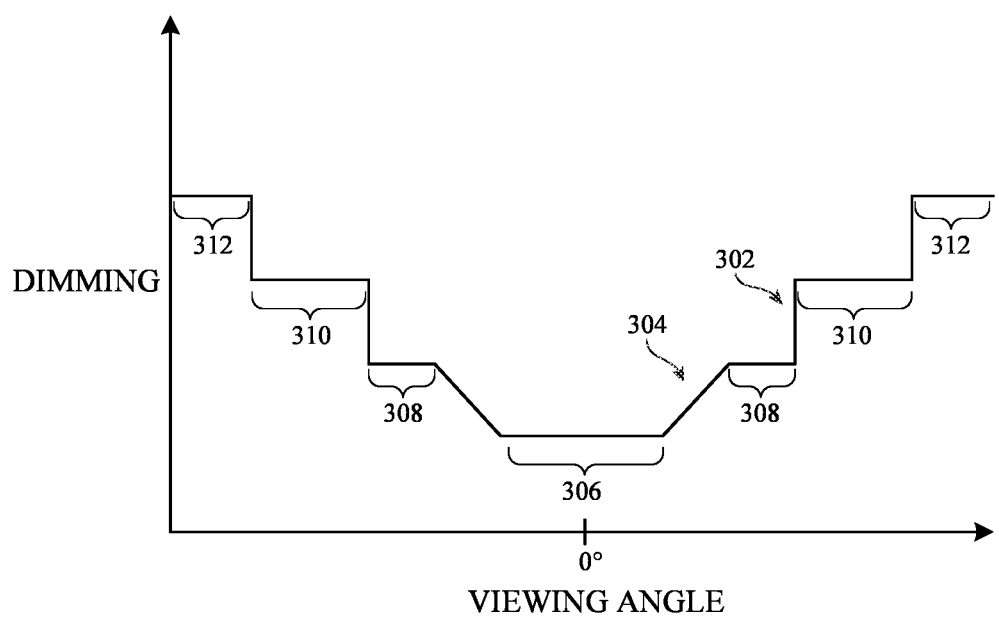

FIGS. 16A-16C show illustrative profiles for the dimming magnitude as a function of viewing angle in the vertical direction. As shown, in FIG. 16A, the relationship between the magnitude of dimming and vertical viewing angle may be linear. The dimming has a minimum at 0 degrees (e.g., an on-axis viewing angle). As the viewing angle decreases, the dimming increases in a linear fashion. Similarly, as the viewing angle increases, the dimming increases in a linear fashion. The profile may be symmetric or asymmetric about the minimum point at 0 degrees.

As shown in FIG. 16B, the relationship between the magnitude of dimming and vertical viewing angle may be non-linear. The dimming has a minimum at 0 degrees (e.g., an on-axis viewing angle). As the viewing angle decreases, the dimming increases in a non-linear fashion. Similarly, as the viewing angle increases, the dimming increases in a non-linear fashion. The profile may be symmetric or asymmetric about the minimum point at 0 degrees. Any desired type of non-linear relationship may be used for the dimming versus vertical viewing angle function (e.g., exponentially increasing, exponentially decreasing, step-function, logarithmic, etc.).

As shown in FIG. 16C, some viewing angles may be binned to have the same dimming magnitude. For example, the display may operate at a full brightness at a range 306 of viewing angles (e.g., between −5 degrees and +5 degrees) instead of at a single viewing angle if desired. Similarly, the display may operate at a constant dimming magnitude across various ranges of angles (e.g., binned angles 308, 310, and 312 in FIG. 16C). There may be a step change (e.g., step change 302) in dimming magnitude between some adjacent binned ranges of viewing angles or there may be a linear or non-linear gradual change (e.g., gradual change 304) in dimming magnitude between some adjacent binned ranges of viewing angles.

In the example of FIGS. 16A-16C, the baseline viewing angle where the display operates at full brightness is 0 degrees. However, the baseline viewing angle where the display operates at full brightness may be shifted if desired. For example, if the most common viewing angle in the vertical direction is +10 degrees, the baseline viewing angle may be +10 degrees and the dimming may increase with increasing deviation from the +10 degree baseline viewing angle. The content rendered by content rendering circuitry 102 may be rendered for an assumed vertical viewing angle that matches the baseline vertical viewing angle of the dimming versus vertical viewing angle profile. In the example where the baseline vertical viewing angle is 0 degrees, content rendering circuitry 102 may render content to simulate viewing from an on-axis (0 degree) vertical viewing angle. In the example where the baseline vertical viewing angle is +10 degrees, content rendering circuitry 102 may render content to simulate viewing from a +10 degree vertical viewing angle.

The example of determining the dimming factor based on the vertical viewing angle is merely illustrative. It should be understood that the vertical viewing angle is a function of the (reprojected) vertical position of the viewer. Therefore, the dimming factor may instead be a function of the vertical position of the viewer (which is, necessarily, a function of the vertical viewing angle of the viewer). There may be a baseline vertical viewer position (associated with the baseline vertical viewing angle). The content rendered by content rendering circuitry 102 may be rendered for the baseline vertical viewer position (and baseline vertical viewing angle). There may be no vertical parallax mismatch when the viewer is at the baseline vertical viewer position. The magnitude of dimming applied to the display may increase with increasing deviation from the baseline vertical viewer position. For example, at the baseline vertical position, no dimming is performed. At a second vertical position that is a first distance from the baseline vertical position, a second amount of dimming is performed. At a third vertical position that is a second distance from the baseline vertical position, a third amount of dimming is performed. The third distance may be greater than the second distance and, accordingly, the third amount of dimming may be greater than the second amount of dimming.

In some cases, pixel dimming circuitry 104 may generate dimming factors based solely on the horizontal viewer position. In these cases, content rendering circuitry 102 may be the only sources of vertical viewer position compensation in the display pipeline. In other cases, pixel dimming circuitry 104 may generate dimming factors based only on the vertical viewer position (e.g., by increasing dimming with increasing deviation from a baseline vertical viewing angle). In yet other cases, pixel dimming circuitry 104 may generate dimming factors based on both the horizontal and vertical viewer position.

As one example, the dimming factor ultimately applied to a pixel may be a function of a horizontal dimming factor determined based on horizontal position and a vertical dimming factor determined based on vertical position (e.g., $DF_{FINAL}=DF_{VERTICAL}+DF_{HORIZONTAL}$, $DF_{FINAL}=DF_{VERTICAL}\times DF_{HORIZONTAL}$, or $DF_{FINAL}=DF_{VERTICAL}-DF_{HORIZONTAL}$, where $DF_{FINAL}$ is the total dimming factor applied to a pixel, $DF_{VERTICAL}$ is the vertical dimming factor, and $DF_{HORIZONTAL}$ is the horizontal dimming factor).

As yet another option, the dimming factor may be used to selectively dim portions of the displayed image that are susceptible to ghosting. The edge viewing zones of the display may be particularly susceptible to ghosting. To avoid excessively dimming the display, selective dimming may be performed only on content that is susceptible to ghosting. Ghosting may be particularly noticeable in areas of high contrast within the image (e.g., at borders), at areas of high luminance (e.g., bright objects) within the image, and/or at content-specific points of interest within the image (e.g., portions of the image that display important parts of the image). Portions of the image with low contrast and/or low luminance (e.g., portions of the image that are approximately the same across all of the viewing zones) may not be dimmed as these areas will not cause ghosting (or will not cause ghosting that detracts from the viewer experience). The pixel dimming circuitry may therefore factor in the content on the display, texture information, reprojected viewer position, and/or viewing zone to generate a content based dimming factor that may also optionally be used when determining the dimming factor for each pixel (e.g., $DF_{FINAL}=DF_{VERTICAL}+DF_{HORIZONTAL}+DF_{CONTENT}$, $DF_{FINAL}=DF_{VERTICAL}\times DF_{HORIZONTAL}\times DF_{CONTENT}$, or $DF_{FINAL}=DF_{VERTICAL}-DF_{HORIZONTAL}-DF_{CONTENT}$, where $DF_{CONTENT}$ is the content-based dimming factor).

When the display is updated based on the detected position of the viewer, changes may optionally be made gradually. For example, viewing zones that are turned on and off may fade in and fade out to avoid visible flickering. Global dimming applied based on vertical viewer position may be applied gradually. The control circuitry may gradually transition any portion of the display between two desired brightness levels any time the brightness level changes.

The example of dimming images on the display based on vertical viewing angle (e.g., using the profile(s) in FIGS. 16A-16C) is merely illustrative. Other mitigation techniques may be used in addition to or instead of dimming the images based on vertical viewing angle. For example, images on the display may be blurred based on vertical viewing angle. The strength of blur applied may follow a profile having any of the properties of the dimming profiles shown in FIGS. 16A-16C. As an example, there may no blur applied when the viewer is within a range of angles centered around a primary viewing position (e.g., an on-axis viewing position). However, at increased off-axis viewing angles the images may be blurred with increasing strength. The images may be blurred by a first amount when the viewer is at a first off-axis viewing angle and the images may be blurred by a second amount that is greater than the first amount when the viewer is at a second off-axis viewing angle that is greater than the first off-axis viewing angle. Blurring may be performed in combination with dimming if desired.

Yet another example of a mitigation technique to compensate for vertical viewing angle is compositing the target content for the display with a default image based on vertical viewing angle. Compositing the target content may comprise merging the target content with the default image at a given ratio. For example, at a first off-axis viewing angle the target content may be presented at a 100%:0% ratio relative to the default image (such that the target content is presented without any merging with the default image). At a second off-axis viewing angle that is greater than the first off-axis viewing angle, the target content may be merged with the default image at a 90%:10% ratio (such that the target content still dominates the presented composite image). At a third off-axis viewing angle that is greater than the second off-axis viewing angle, the target content may be merged with the default image at a 50%:50% ratio (such that the target content is merged equally with the default image in the presented composite image). At a fourth off-axis viewing angle that is greater than the third off-axis viewing angle, the target content may be merged with the default image at a 10%:90% ratio (such that the default image dominates the presented composite image). At a fifth off-axis viewing angle that is greater than the fourth off-axis viewing angle, the target content may be presented at a 0%:100% ratio relative to the default image (such that the default image is presented without any merging with the target content). The percentage of the composite image attributed to the default image therefore increases with increasing viewing angle. The percentage of the composite image attributed to the default image may follow a profile having any of the properties of the dimming profiles shown in FIGS. 16A-16C. Compositing the target content for the display with a default image may be performed in combination with blurring and/or dimming if desired.

Figure 17:
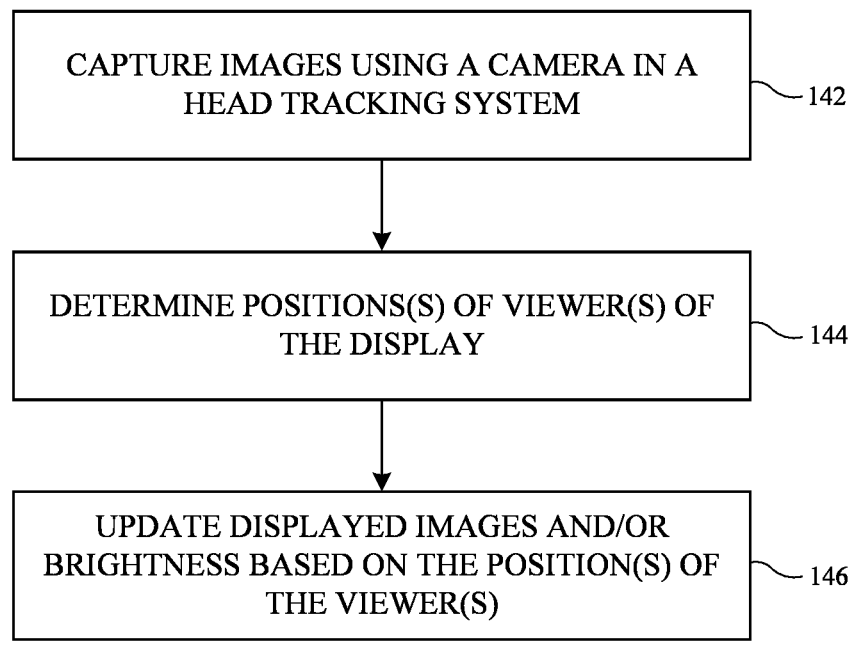
FIG. 17 is a flowchart showing illustrative method steps involved in operating an electronic device with a display and a head tracking system in accordance with some embodiments.

FIG. 17 is a flowchart of illustrative method steps for operating an electronic device with pipeline circuitry of the type shown in FIG. 15. At step 142, a camera (e.g., camera 54 in eye and/or head tracking system 18) may be used to capture images of an environment around the electronic display. In particular, the camera may capture images of an area in front of the display where a viewer of the display is expected to be present. The viewer of the display may be expected at distances greater than 1 foot from the display, greater than 2 feet from the display, greater than 3 feet from the display, greater than 5 feet from the display, greater than 10 feet from the display, etc.

At step 144, the position of one or more viewers of the display may be determined. Control circuitry such as control circuitry 16 may use the captured images from the camera to determine how many viewers are present and the positions of the viewers. The example of using a camera to determine viewer position is merely illustrative. Eye and/or head tracking system may include a light detection and ranging (lidar) sensor, a time-of-flight (ToF) sensor, an accelerometer (e.g., to detect the orientation of electronic device 10), a camera, or a combination of two or more of these components. It is noted that the viewer position determined at step 144 (and used for subsequent compensation) may be a reprojected viewer position based on the position of the viewer relative to device 10 (accounting for changes in location and/or pose of device 10). Based on sensor data from one or more sensors in the eye and/or head tracking system, the control circuitry may determine in which viewing zone each viewer eye is located (e.g., the horizontal position of each viewer eye). The control circuitry may also determine the vertical position of each viewer eye based on the sensor information. The gaze direction of the viewer need not be determined to identify which viewing zones the viewer eyes are located in. In other words, control circuitry 16 may, in some cases, use only the determined position of the user's eyes (e.g., in a plane in front of the display) for subsequent processing, and not the direction-of-gaze of the user's eyes.

Finally, at step 146, based on the determined positions of the viewer, the brightness of one or more zones and/or the image displayed by one or more zones may be updated. FIGS. 8A and 8B show how unoccupied zones may be turned off based on the horizontal viewer position. FIGS. 9A-10B show how zone brightness levels may be modified based on horizontal viewer position to preserve power while avoiding latency artifacts. FIGS. 11 and 12 show examples where the images for one or more zones may be updated based on the determined horizontal viewer position to increase display sharpness. FIG. 15 shows how content rendering circuitry 102 may change the rendered content to account for the determined vertical viewer position. FIGS. 15 and 16 also show how the display may be dimmed globally to account for the determined vertical viewer position. Instead of or in addition to dimming, the content presented on the display may be blurred and/or composited with a default image to account for the determined vertical viewer position. The control circuitry 16 may gradually transition the display between brightness levels when switching brightness levels.

In the display described in connection with FIG. 5, the stereoscopic display includes lenticular lenses that spread the display light in the horizontal direction but not the vertical direction. As a result of this arrangement, horizontal parallax may be correct as a viewer moves horizontally relative to the display, but vertical parallax may remain constant as a viewer moves vertically relative to the display. The techniques described in connection with FIG. 15 may be used to account for the fact that the lenticular lenses of the display have a fixed vertical parallax.

However, another option for avoiding vertical parallax mismatch artifacts is to incorporate lenses in the display that spread light in both the horizontal and vertical directions. In this way, the lenses can provide multiple viewing zones in the vertical direction in addition to multiple viewing zones in the horizontal direction. The display viewing zones may then account for the vertical parallax such that the three-dimensional content on the display has an appropriate simulated real-life appearance regardless of the horizontal viewing angle and vertical viewing angle.

Figure 18:
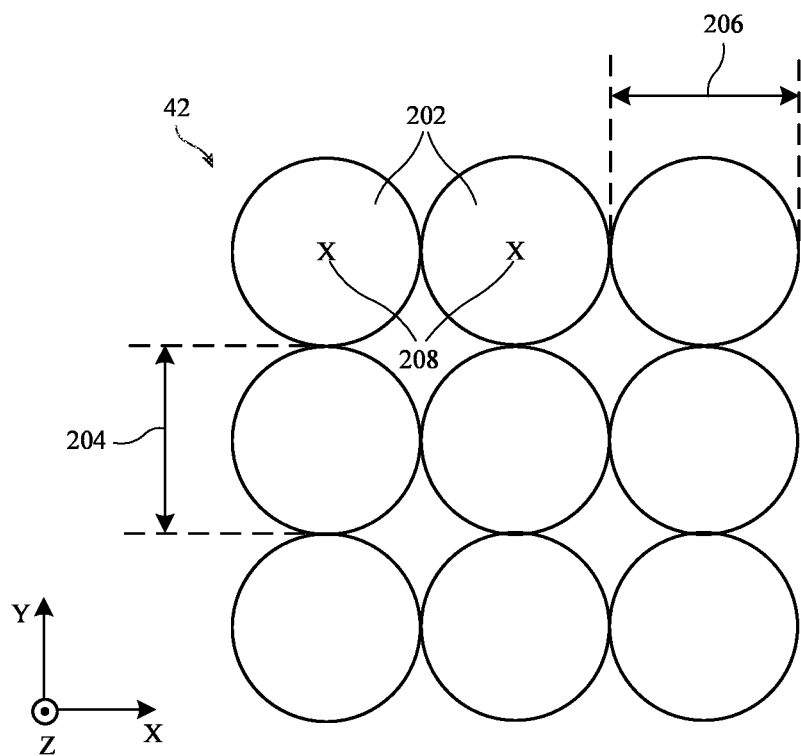
FIG. 18 is a top view of an illustrative lens array with circular lenses in a square grid that may be used to spread light in both the horizontal and vertical directions in accordance with some embodiments.

FIG. 18 is a top view of an illustrative lens array that may be used to enable full parallax (e.g., both horizontal and vertical) in the display. In the example of FIG. 18, lens film 42 includes an array of lenses 202 that each spread light both along the horizontal direction (e.g., along the X-axis) and along the vertical direction (e.g., along the Y-axis). In FIG. 18, each lens 202 has a circular footprint. In other words, the length 204 of the footprint of the lens along the Y-axis is the same as the length 206 of the footprint of the lens along the X-axis. This example is merely illustrative. If desired, lengths 204 and 206 may be different such that each lens has an oval footprint.

In FIG. 18, the lenses 202 are arranged in a square grid. In other words, the lenses are arranged in a plurality of rows and columns. Each row is aligned with the previous and subsequent rows in the Y-direction such that the centers 208 of every lens in a given column form a line that is parallel to the Y-axis.

The example of FIG. 18 is merely illustrative. In another possible embodiment, shown in FIG. 19, the lenses 202 may be arranged in an offset grid where each row is offset in the X-direction relative to the preceding and subsequent rows. Consequently, the lenses may be spaced closer together along the Y-axis, with less uncovered space between each lens. The offset grid may have lenses with a circular footprint when viewed from above or an oval footprint when viewed from above. This pattern may be used with columns and rows inversed, if desired. The lenses in FIG. 19 may also be oval instead of circular if desired.

Figure 19:
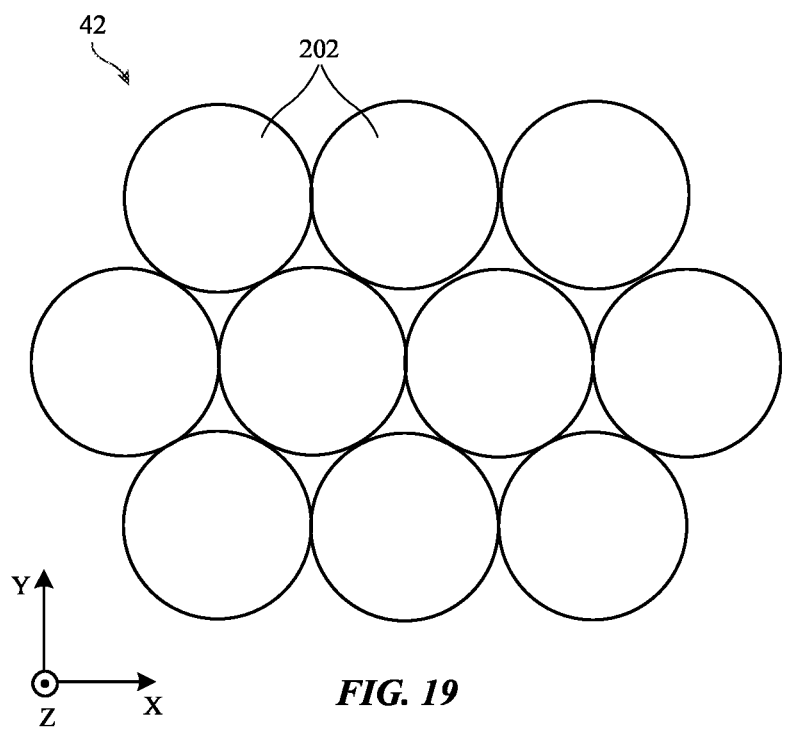
FIG. 19 is a top view of an illustrative lens array with circular lenses in an offset grid that may be used to spread light in both the horizontal and vertical directions in accordance with some embodiments.
Figure 20:
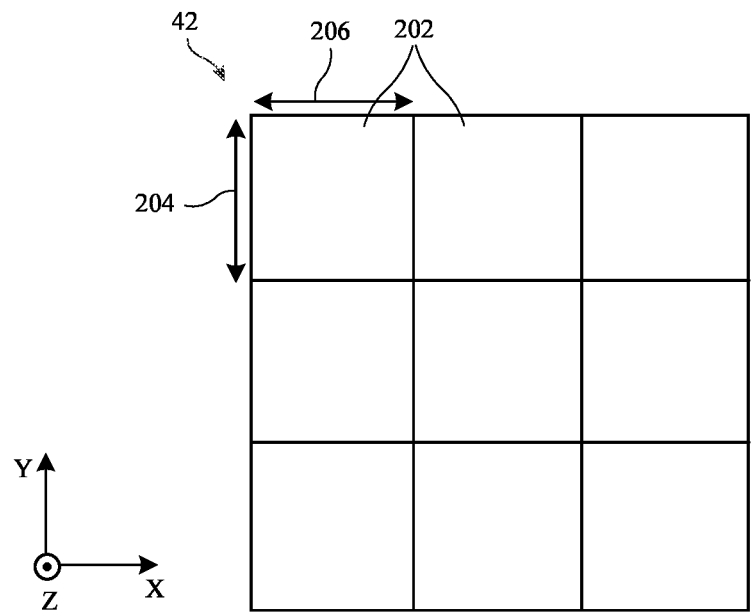
FIG. 20 is a top view of an illustrative lens array with square lenses in a grid that may be used to spread light in both the horizontal and vertical directions in accordance with some embodiments.

The example of FIGS. 18 and 19 of the lenses having a circular or oval footprint is merely illustrative. In some cases, the lenses may have a footprint that is square, non-square rectangular, hexagonal, or any other desired shape. FIG. 20 is a top view of an illustrative lens array that may be used to enable full parallax (e.g., both horizontal and vertical) in the display. In the example of FIG. 20, lens film 42 includes an array of lenses 202 that each spread light both along the horizontal direction (e.g., along the X-axis) and along the vertical direction (e.g., along the Y-axis). In FIG. 20, each lens 202 has a square footprint. In other words, the length 204 of the footprint of the lens along the Y-axis is the same as the length 206 of the footprint of the lens along the X-axis. This example is merely illustrative. If desired, lengths 204 and 206 may be different such that each lens has a non-square rectangular footprint.

In FIG. 20, the lenses 202 are arranged in a square grid. In other words, the lenses are arranged in a plurality of rows and columns. Each row is aligned with the previous and subsequent rows in the Y-direction such that the centers of every lens in a given column form a line that is parallel to the Y-axis. This example is merely illustrative and the square (or non-square rectangular) lenses may be arranged in an offset grid if desired.

Figure 21:
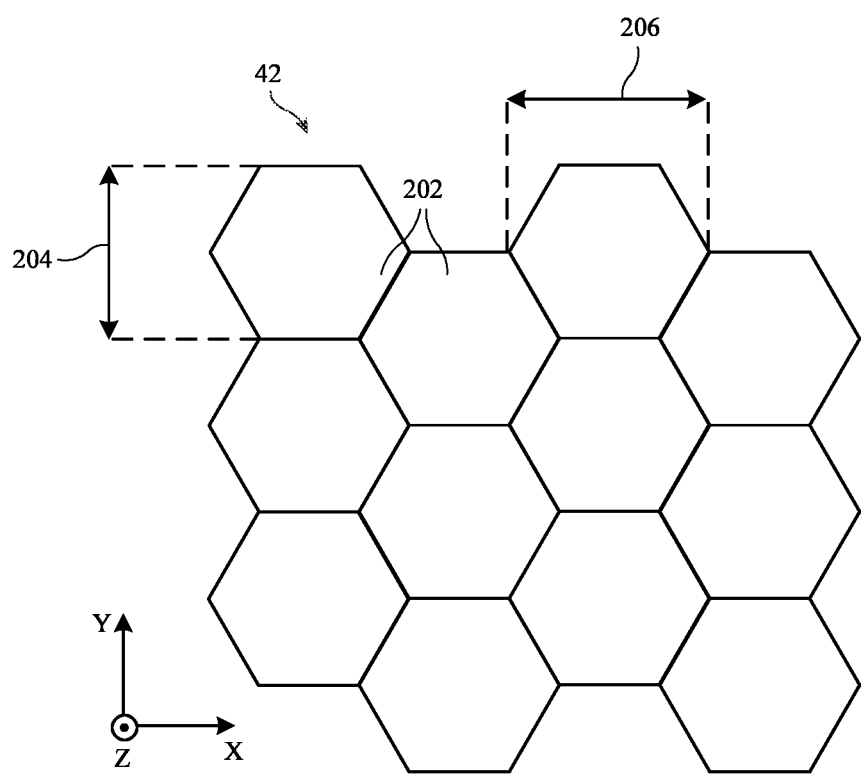
FIG. 21 is a top view of an illustrative lens array with hexagonal lenses in an offset grid that may be used to spread light in both the horizontal and vertical directions in accordance with some embodiments.

In FIG. 21, the lenses have a hexagonal footprint and are arranged in an offset grid (e.g., a honeycomb pattern) to reduce/eliminate uncovered space between the lenses. In FIG. 21, the length 204 of the footprint of the lens along the Y-axis is the same as the length 206 of the footprint of the lens along the X-axis. This example is merely illustrative. If desired, lengths 204 and 206 for each lens 202 may be different. In FIG. 21, each column of lenses is offset in the Y-direction relative to the subsequent and preceding columns. This pattern may be used with columns and rows inversed, if desired.

In general, film 42 may include an array of lenses with any desired arrangement (e.g., a square grid, offset grid, or another desired arrangement). Each lens 202 in the lens film 42 may have any desired footprint (e.g., circular, oval, square, non-square rectangular, hexagonal, octagonal, etc.).

Each lens 202 in FIGS. 18-21 may have an upper surface with curvature along both the X-axis and the Y-axis. Consequently, the light from the display is spread in both the X-direction and Y-direction. In this type of arrangement, the content may be rendered and assigned to viewing zones such that as a viewer moves horizontally and/or vertically, the appearance of the three-dimensional content on the display gradually changes to simulate looking at a real-world object.

Each lens 202 in FIGS. 18-21 may cover any desired number of rows and columns of pixels (and, accordingly, any desired total number of pixels). Each lens may overlap two rows of pixels, three rows of pixels, more than three rows of pixels, more than four rows of pixels, more than eight rows of pixels, more than ten rows of pixels, more than fifteen rows of pixels, more than twenty rows of pixels, more than thirty rows of pixels, less than fifty rows of pixels, less than one hundred rows of pixels, etc. Each lens may overlap two columns of pixels, three columns of pixels, more than three columns of pixels, more than four columns of pixels, more than eight columns of pixels, more than ten columns of pixels, more than fifteen columns of pixels, more than twenty columns of pixels, more than thirty columns of pixels, less than fifty columns of pixels, less than one hundred columns of pixels, etc. Each lens may overlap two total pixels, more than two total pixels, more than four total pixels, more than ten total pixels, more than fifty total pixels, more than one hundred total pixels, more than five hundred total pixels, less than five hundred total pixels, less than two hundred total pixels, etc.

The lenses in two-dimensional lens film 42 in FIGS. 18-21 direct light to a plurality of distinct viewing zones (similar to as shown in FIG. 6, except the viewing zones resulting from the films of FIGS. 18-21 extend in both the horizontal and vertical directions). The viewing zones may be arranged in a grid, as one example. The display pipeline circuitry 64 for a display of this type may be similar to the display pipeline circuitry shown and discussed in connection with FIGS. 14 and 15 (e.g., with content rendering circuitry, pixel dimming circuitry, etc.).

It has previously been discussed how dimming factors may be applied to different viewing zones of a display based the position of a viewer relative to the display. For example, the viewing zones of the display may have a brightness profile of the type shown in FIGS. 9-10. Instead or in addition, a dimming factor may be applied based on the vertical position of a viewer. It should additionally be understood that one or both of these types of dimming may be applied when there are multiple viewers of the display, and that different dimming schemes may be used for different viewers of the display.

Figure 22:
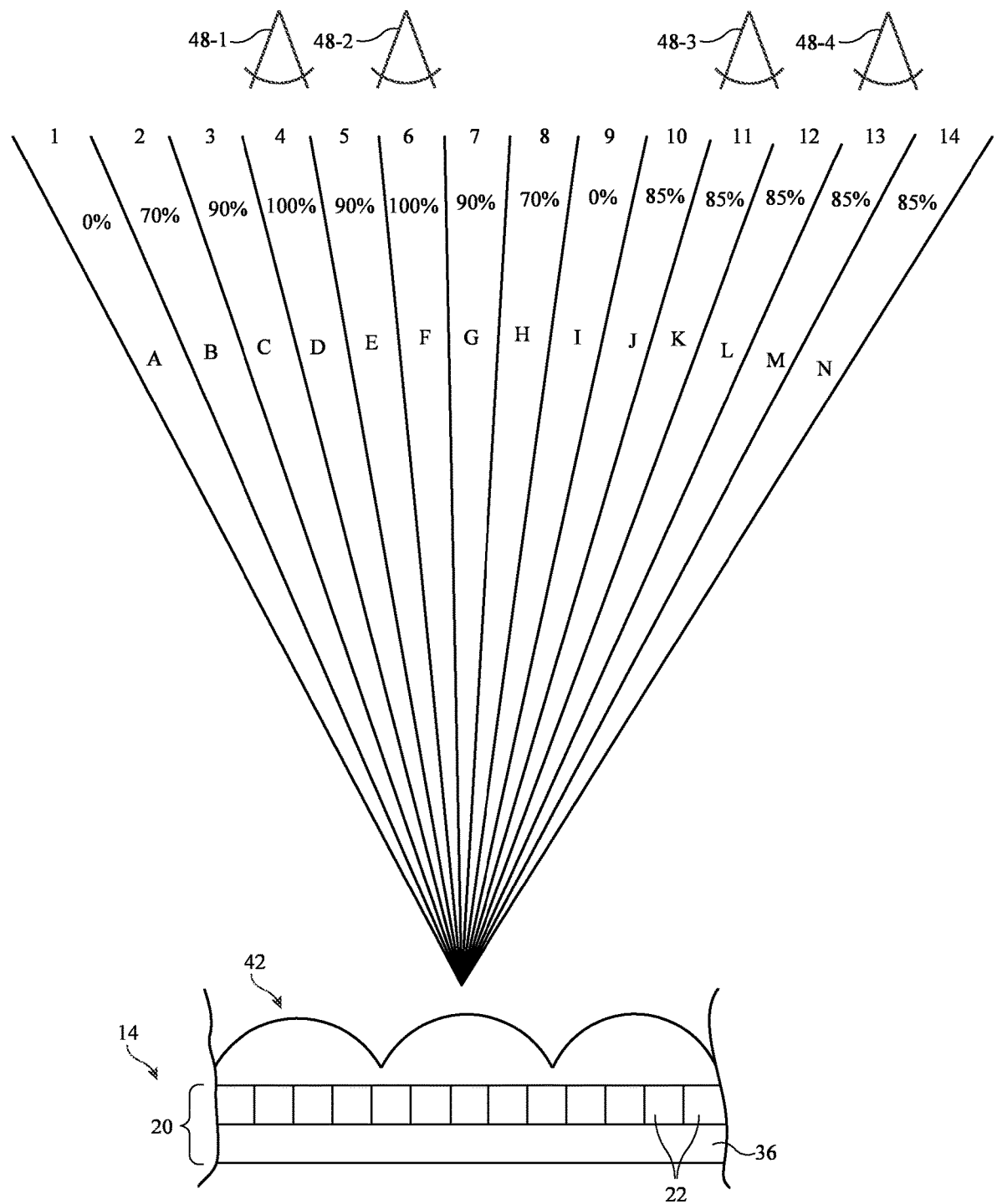
FIG. 22 is a side view of an illustrative display with viewing zones that have brightness levels with different dimming schemes for two distinct viewers in accordance with some embodiments.

Consider the example of FIG. 22. In this example, display 14 is being viewed by a viewer with a first eye (e.g., a right eye) 48-1 and a second eye (e.g., a left eye) 48-2. The first eye 48-1 is present in viewing zone 4 whereas the second eye is present in viewing zone 6. Simultaneously, the display is being viewed by a viewer with a first eye (e.g., a right eye) 48-3 and a second eye (e.g., a left eye) 48-4. The first eye 48-3 is present in viewing zone 11 and the second eye is present in viewing zone 13.

Because the viewers are positioned in different viewing zones, different dimming profiles may be assigned to each viewer. For example, eyes 48-1 and 48-2 are provided with dimming factors across the viewing zones based on a Gaussian profile (as previously shown in FIGS. 10A and 10B). Eyes 48-3 and 48-4 are provided with dimming factors across the viewing zones based on a step profile (as previously shown in FIGS. 9A and 9B).

Additionally, the different viewers may be assigned different global dimming factors based on their respective vertical viewing angles. For example, eyes 48-1 and 48-2 may be at position B in FIG. 13 (e.g., an on-axis vertical position). Accordingly, the global dimming factor for eyes 48-1 and 48-2 may be a gain of 100% (e.g., no dimming is required). Eyes 48-3 and 48-4, on the other hand, may be positioned at position A in FIG. 13 (e.g., an off-axis vertical position). Accordingly, the global dimming factor for eyes 48-3 and 48-4 may be a gain of 85% (e.g., less than 100% so that some dimming is applied). The vertical dimming factor (determined using a vertical viewing position of the viewer) may be applied to any desired horizontal dimming profile (e.g., a Gaussian profile or a step profile). In other words, the vertical dimming factor (determined based on vertical eye position and the vertical dimming profile) may be multiplied by the horizontal dimming factor (determined based on horizontal eye position and the horizontal dimming profile) to determine an overall dimming factor for each viewing zone.

The number of viewing zones associated with each viewer may be the same or may be different. In general, each viewer may have any number of associated viewing zones. In FIG. 22, the first viewer (with eyes 48-1 and 48-2) has 7 associated viewing zones whereas the second viewer (with eyes 48-3 and 48-4) has 5 associated viewing zones.

If desired, the same global dimming profile (e.g., the profile of FIG. 16A or the profile of FIG. 16B) may be used for each viewer. Alternatively, different global dimming profiles may be used for each viewer (e.g., the profile of FIG. 16A is used for one viewer and the profile of FIG. 16B is used for the second viewer).

It has previously been discussed how content adjustments may be applied to the display based the position of a viewer relative to the display. In particular, content rendering circuitry 102 may receive viewer position information from eye and/or head tracking system 18. To mitigate vertical parallax mismatch in the display, content rendering circuitry 102 may render content that accounts for the viewer's position in the vertical direction. If the viewer is positioned such that they are viewing the display from an on-axis direction (e.g., position B in FIG. 13), the content may be rendered to have an appearance that matches the on-axis viewing direction. If the viewer is positioned such that they are viewing the display from a positive off-axis direction (e.g., position A in FIG. 13), the content may be rendered to have an appearance that matches the positive off-axis viewing direction. If the viewer is positioned such that they are viewing the display from a negative off-axis direction (e.g., position C in FIG. 13), the content may be rendered to have an appearance that matches the negative off-axis viewing direction.

In the previous descriptions, an example is provided where the two-dimensional images that are each associated with a respective viewing zone may be two-dimensional images of the same content at different horizontal perspectives and a single vertical perspective (that is based on the vertical eye position determined using eye tracking system 18). The single vertical perspective may be updated as the vertical eye position changes to provide the image with vertical parallax that matches the vertical eye position (e.g., real-time updates to match the vertical eye position).

This example is merely illustrative. In a scenario with multiple viewers (e.g., as shown in FIG. 22), content rendering circuitry 102 may render two-dimensional images of the same content at different horizontal perspectives and different vertical perspectives (that are based on the vertical eye positions determined using eye tracking system 18). For example, in the example of FIG. 22 the content rendering circuitry 102 may render two-dimensional images for zones 4 and 6 (which are occupied by eyes 48-1 and 48-2 respectively) at a first vertical perspective based on the vertical viewing angle of eyes 48-1 and 48-2. The content rendering circuitry 102 also renders two-dimensional images for zones 11 and 13 (which are occupied by eyes 48-3 and 48-4 respectively) at a second vertical perspective based on the vertical viewing angle of eyes 48-3 and 48-4.

As a specific example, eyes 48-1 and 48-2 may be positioned such that they are viewing the display from an on-axis direction (e.g., position B in FIG. 13) and the content for zones 4 and 6 may therefore be rendered to have an appearance that matches the on-axis viewing direction. Eyes 48-3 and 48-4 may be positioned such that they are viewing the display from a positive off-axis direction (e.g., position A in FIG. 13) and the content for zones 11 and 13 may therefore be rendered to have an appearance that matches the positive off-axis viewing direction. In this way, the content rendering circuitry provides two-dimensional images of the same content at different horizontal perspectives and different vertical perspectives (to optimize the appearance of the content to each viewer of the display). The different vertical perspectives of the content may be updated in real time based on changes in the vertical viewing position of the viewers.

In some cases, instead of full vertical parallax content correction, a baseline image may be shifted on the display to mitigate visible artifacts for the viewer (based on vertical viewing position) while mitigating latency. For example, consider a scenario where a viewer shifts from viewing position B in FIG. 13 (at an on-axis vertical viewing position) at a first time to viewing position A in FIG. 13 (at a positive off-axis viewing position) at a second time subsequent to the first time.

At the first time, the images presented for the viewer may be rendered to match the on-axis viewing direction. When the viewer moves from the first position to the second position, the images presented for the viewer are ideally rendered to match the positive off-axis viewing direction. However, there may be some latency in updating the content for vertical parallax changes in this manner. To compensate for this latency, the images rendered for position B may be shifted and used while the user is at position A at the second time. In other words, the content is rendered to match the on-axis viewing direction. At the second time, the content is shifted (panned) on the display to mitigate mismatch between the user's actual viewing position (at position A) and the optimal viewing position (at position B) for the content.

Figure 23:
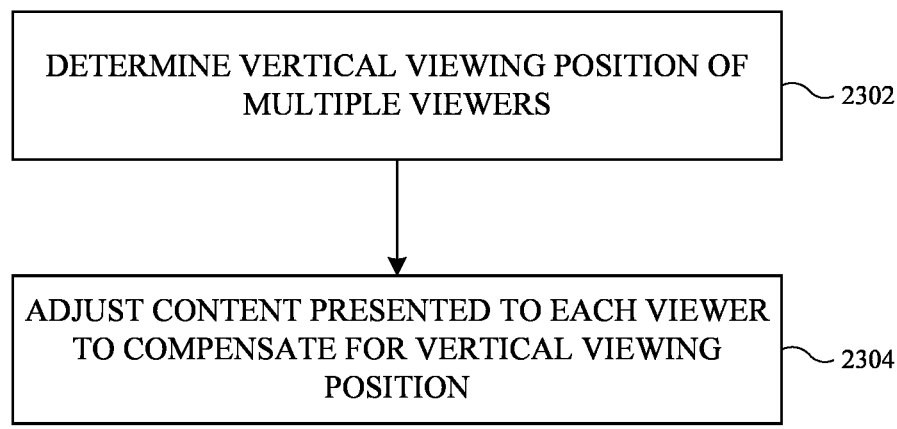
FIG. 23 is a flowchart showing illustrative method steps involved in operating an electronic device with a display viewed by multiple viewers in accordance with some embodiments.

FIG. 23 is a flowchart of illustrative method steps for operating electronic device 10. At step 2302, eye and/or head tracking system 18 may determine the viewing position of multiple viewers of a display within electronic device 10. The eye and/or head tracking system may determine both vertical viewing angle (e.g., based on the vertical displacement between the electronic device and the viewer) and the horizontal viewing angle (e.g., based on the horizontal displacement between the electronic device and the viewer). It is noted that the viewer positions determined at step 2302 (and used for subsequent compensation) may be reprojected viewer positions based on the position of the viewer relative to device 10 (accounting for changes in location and/or pose of device 10).

At step 2304, control circuitry 16 (e.g., content rendering circuitry 102) may adjust content presented to each viewer to compensate for their vertical viewing position. In some cases, the content may be rendered to match the detected vertical viewing angle of the viewers. In other cases, the presented content for a given viewer is rendered for a different vertical viewing angle than the current position of the viewer (e.g., the content is rendered for position B in FIG. 13 but the viewer is at position A in FIG. 13). In these cases, the content may be shifted at step 2304 to mitigate the detectability of the vertical parallax mismatch for the viewer.

In some situations with multiple viewers, different viewers may occupy a single viewing zone. In this situation, control circuitry 16 in device 10 may identify one of the viewers occupying the single viewing zone as a primary viewer and optimize the presented content for the position of the primary viewer. There are multiple factors that may be considered to determine which viewer is the primary viewer in a single viewing zone.

FIGS. 24A and 24B are top views of illustrative electronic devices with displays being viewed by multiple viewers. In FIG. 24A, a first viewer has eyes 48-1 and 48-2 and a second viewer has eyes 48-3 and 48-4. The first and second viewers may be at different vertical viewing angles. For example, eyes 48-1 and 48-2 may be at position B in FIG. 13 (e.g., an on-axis vertical viewing angle) whereas eyes 48-3 and 48-4 may be at position A in FIG. 13 (e.g., a positive off-axis vertical viewing angle). Eyes 48-2 and 48-3 may both occupy a single viewing zone (even though the eyes are at different vertical viewing angles). As one example, the viewer that is closer to the display may be considered the primary viewer. In the example of FIG. 24A, the first viewer with eyes 48-1 and 48-2 is closer to the display and would be considered the primary viewer. Accordingly, the content presented in the viewing zone including eyes 48-2 and 48-3 would be optimized for the position of eye 48-2 (e.g., and the on-axis vertical viewing angle of eye 48-2).

The example of treating the closer viewer as the primary viewer is merely illustrative. In another possible scenario, shown in FIG. 24B, a first viewer has eyes 48-1 and 48-2 and a second viewer has eyes 48-3 and 48-4. The first and second viewers may be at different vertical viewing angles. For example, eyes 48-1 and 48-2 may be at position B in FIG. 13 (e.g., an on-axis vertical viewing angle) whereas eyes 48-3 and 48-4 may be at position A in FIG. 13 (e.g., a positive off-axis vertical viewing angle). Eyes 48-2 and 48-3 may both occupy a single viewing zone (even though the eyes are at different vertical viewing angles). As another example, the viewer with a smaller horizontal viewing angle may be considered the primary viewer in this type of scenario. In the example of FIG. 24B, the first viewer with eyes 48-1 and 48-2 has a horizontal viewing angle that is less than horizontal viewing angle of the second viewer with eyes 48-3 and 48-4. Therefore, the first viewer with eyes 48-1 and 48-2 may be considered the primary viewer (even though the first viewer is further from the display than the second viewer). Accordingly, the content presented in the viewing zone including eyes 48-2 and 48-3 would be optimized for the position of eye 48-2 (e.g., and the on-axis vertical viewing angle of eye 48-2).

In general, when multiple viewers occupy a single viewing zone, the primary viewer may be determined based on (for each viewer) one or more of the distance from the viewer to the display, vertical viewing angle of the display, horizontal viewing angle of the display, etc. A single variable may be the determining factor for the primary viewer decision (with optional secondary variables used as tiebreakers) or multiple variables may be weighted (equally or unequally) in making the primary viewer decision.

As previously mentioned in connection with FIG. 1, electronic device 10 may include one or more motion sensors 17 that are used to determine the pose of electronic device 10 relative to the surrounding environment. The pose of the electronic device refers to the orientation of the device (e.g., yaw, roll, and pitch) at a given location. The one or more motion sensors may also determine the location of the electronic device (e.g., a coordinate within three-dimensional space that corresponds to a center of the electronic device). In some cases, there may be latency in eye and/or head tracking system 18 determining the position of a viewer. When the pose and/or location of an electronic device changes, motion detected by motion sensors 17 may be used to estimate viewer position until eye and/or head tracking system 18 directly identifies the new viewer position relative to the electronic device.

Figure 25A:
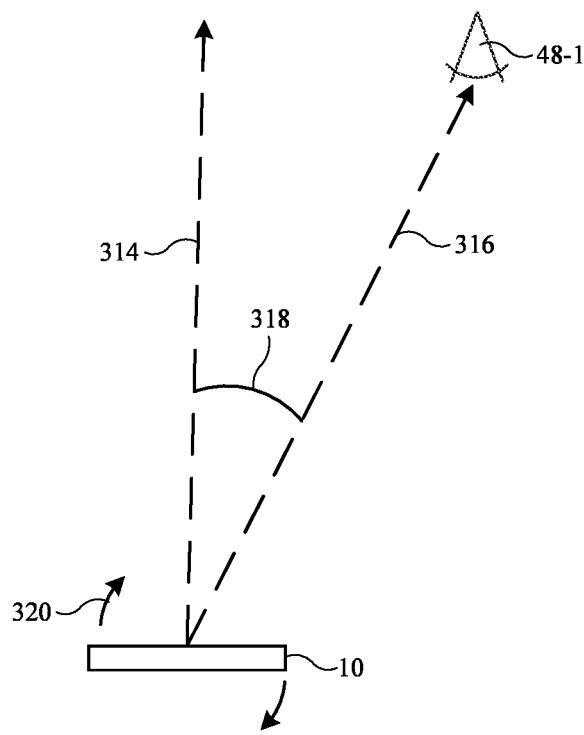
FIGS. 25A and 25B are side views of an illustrative electronic device showing how a pose change of the electronic device may change the position of a viewer relative to the electronic device in accordance with some embodiments.
Figure 25B:
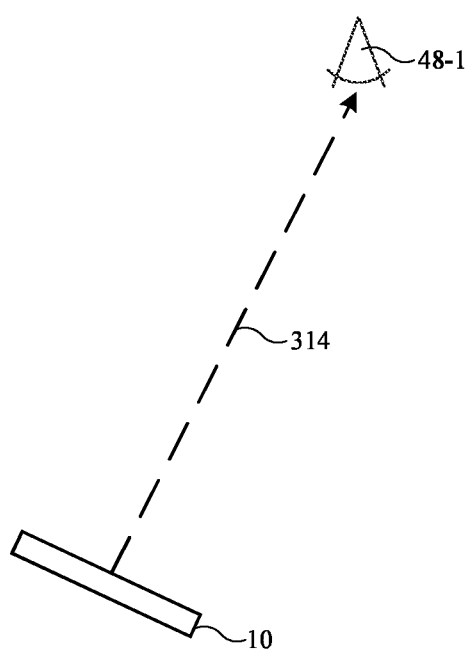

Consider the example of electronic device 10 in FIGS. 25A and 25B. In FIG. 25A, electronic device 10 (and display 14) have a surface normal 314 that is at an angle 318 relative to the horizontal viewing position of eye 48-1. Eye and/or head tracking system 18 may determine the position of eye 48-1. The pose of electronic device 10 may then be rotated (e.g., in direction 320) such that the electronic device 10 has the pose in FIG. 25B. In FIG. 25B, the surface normal 314 is aligned with eye 48-1.

Control circuitry 16 may assume that eye 48-1 remains in a fixed position when the pose of the electronic device changes. There may be a latency period during which eye and/or head tracking system 18 has not yet identified the change in relative position between device 10 and eye 48-1. During the latency period, pose information from motion sensors 17 may be used to provide the viewer position to corresponding circuitry (e.g., content rendering circuitry 102 and/or pixel dimming circuitry 104 in FIG. 15).

In FIGS. 25A and 25B, for example, motion sensor 17 may identify a rotation by angle 318 in the pose of electronic device 10. Control circuitry 16 may receive this pose change information and, assuming that the viewer position remains fixed during the pose change, estimate the updated viewer position relative to the electronic device based on the pose change information. In this example, control circuitry 16 may know that before the pose change (in FIG. eye 48-1 is at a horizontal angle 318 relative to device 10. The pose change information may inform control circuitry 16 that the device has changed the horizontal angle relative to the fixed viewer position by angle 318. Therefore, control circuitry 16 may estimate that the fixed viewer position is now aligned with the surface normal of the electronic device after the pose change. This determined viewer position relative to the electronic device (based on pose change information) may be used for subsequent processing (e.g., content rendering). Once eye and/or head tracking system 18 actively determines the position of eye 48-1, the position identified by eye and/or head tracking system 18 may again be used for subsequent processing instead of the position estimated based on device pose change information.

FIGS. 25A and 25B show an example where the viewer position is estimated based on a change in pose of the electronic device. The viewer position may instead or in addition be based on a change in location of the electronic device.

It is noted that content rendering circuitry 102 and pixel dimming circuitry 104 in FIG. may be considered part of control circuitry 16 of device 10. Each one of content rendering circuitry 102 and pixel dimming circuitry 104 may include storage such as hard disk drive storage, nonvolatile memory (e.g., flash memory or other electrically-programmable-read-only memory configured to form a solid state drive), volatile memory (e.g., static or dynamic random-access-memory), etc. and processing circuitry based on one or more microprocessors, microcontrollers, digital signal processors, baseband processors, application specific integrated circuits, etc.

It should be noted that a portion of eye and/or head tracking system 18 (which may be considered part of control circuitry 16) may reproject the viewer position based on changes in the device pose and/or location. Alternatively, control circuitry that is separate from eye and/or head tracking system 18 may reproject the viewer position based on changes in the device pose and/or location before providing the reprojected viewer position(s) to downstream components.

In accordance with an embodiment, an electronic device is provided that includes a display that includes an array of pixels and a lenticular lens film formed over the array of pixels, the lenticular lens film spreads light from the display in a horizontal direction and the display has a plurality of independently controllable viewing zones in the horizontal direction; at least one sensor configured to obtain sensor data; and control circuitry configured to: determine eye position information based on the sensor data, the eye position information includes a vertical eye position and a horizontal eye position; and dim at least one pixel in the array of pixels based on the vertical eye position.

In accordance with another embodiment, dimming the at least one pixel in the array of pixels based on the vertical eye position includes globally dimming all of the pixels in the array of pixels based on the vertical eye position.

In accordance with another embodiment, dimming the at least one pixel in the array of pixels based on the vertical eye position includes applying a dimming factor to all of the pixels in the array of pixels, the dimming factor is based on the vertical eye position, and the same dimming factor is used for every pixel in the array of pixels.

In accordance with another embodiment, dimming the at least one pixel in the array of pixels based on the vertical eye position includes applying a dimming factor to an input brightness value for the at least one pixel.

In accordance with another embodiment, the dimming factor is proportional to a deviation between the vertical eye position and a baseline vertical eye position.

In accordance with another embodiment, the dimming factor is a function of a horizontal dimming factor that is based on the horizontal eye position and a vertical dimming factor that is based on the vertical eye position.

In accordance with another embodiment, dimming the at least one pixel in the array of pixels based on the vertical eye position includes at a first time, while the vertical eye position differs from a baseline vertical eye position by a first magnitude, dimming the at least one pixel by a first amount; and at a second time subsequent to the first time, while the vertical eye position differs from the baseline vertical eye position by a second magnitude that is greater than the first magnitude, dimming the at least one pixel by a second amount that is greater than the first amount.

In accordance with another embodiment, dimming the at least one pixel in the array of pixels based on the vertical eye position includes at a third time subsequent to the second time, while the vertical eye position is equal to the baseline vertical eye position, operating the at least one pixel without any dimming.

In accordance with another embodiment, the control circuitry is configured to: determine additional eye position information based on the sensor data, the additional eye position information includes an additional vertical eye position and an additional horizontal eye position; and dim an additional pixel that is different than the at least one pixel based on the additional vertical eye position.

In accordance with an embodiment, an electronic device is provided that includes a display that includes an array of pixels and a lenticular lens film formed over the array of pixels, the lenticular lens film spreads light from the display in a horizontal direction and the display has a plurality of independently controllable viewing zones in the horizontal direction; at least one sensor configured to obtain sensor data; and control circuitry configured to: determine eye position information from the sensor data, the eye position information includes a vertical eye position and a horizontal eye position; and render content for the display based at least partially on the vertical eye position, the rendered content includes two-dimensional images that are each associated with a respective viewing zone.

In accordance with another embodiment, the control circuitry is further configured to map each two-dimensional image to respective pixels on the array of pixels to obtain pixel data for the array of pixels.

In accordance with another embodiment, the two-dimensional images that are each associated with a respective viewing zone are two-dimensional images of the same content at different horizontal perspectives.

In accordance with another embodiment, the two-dimensional images that are each associated with a respective viewing zone are two-dimensional images of the same content at different horizontal perspectives and a single vertical perspective that is based on the vertical eye position.

In accordance with another embodiment, the control circuitry is further configured to dim at least some of the pixels based on the horizontal eye position.

In accordance with another embodiment, dimming at least some of the pixels based on the horizontal eye position includes, for each pixel: determining a texture associated with the pixel; determining a viewing zone associated with the pixel; and generating a dimming factor based on the texture, the viewing zone, and the horizontal eye position.

In accordance with another embodiment, dimming at least some of the pixels based on the horizontal eye position includes, for each pixel, dimming the pixel based on the horizontal eye position and content information associated with the pixel.

In accordance with an embodiment, an electronic device is provided that includes a stereoscopic display includes an array of pixels; and an array of lenses formed over the array of pixels, each lens in the array of lenses spreads light from the array of pixels in both a first direction and a second direction that is orthogonal to the first direction and the array of lenses directs the light to a plurality of independently controllable viewing zones; and content rendering circuitry configured to render content for the stereoscopic display, the rendered content includes two-dimensional images that are each associated with a respective viewing zone; and pixel mapping circuitry configured to map each two-dimensional image to respective pixels on the array of pixels to obtain pixel data for the array of pixels.

In accordance with another embodiment, each lens in the array of lenses has a circular footprint.

In accordance with another embodiment, each lens in the array of lenses has a square footprint.

In accordance with another embodiment, each lens in the array of lenses has a hexagonal footprint.

In accordance with another embodiment, each lens in the array of lenses has an upper surface that has first curvature along the first direction and has second curvature along the second direction.

The foregoing is merely illustrative and various modifications can be made to the described embodiments. The foregoing embodiments may be implemented individually or in any combination.

The invention claimed is:

1. An electronic device configured to be worn on a user's head, the electronic device comprising:
a display that includes an array of pixels and a lens film formed over the array of pixels, wherein the lens film spreads light from the display in at least a horizontal direction;
at least one sensor configured to obtain sensor data; and
control circuitry configured to:
determine first eye position information for a first viewer from the sensor data, wherein the first eye position information includes a first vertical eye position and a first horizontal eye position;
determine second eye position information for a second viewer from the sensor data, wherein the second eye position information includes a second vertical eye position and a second horizontal eye position; and
render content for the display, wherein the rendered content includes first content for the first viewer that is based at least partially on the first vertical eye position and second content for the second viewer that is based at least partially on a third vertical eye position different than the second vertical eye position.

2. The electronic device defined in claim 1, wherein the rendered content comprises a plurality of two-dimensional images and wherein the control circuitry is further configured to map each two-dimensional image to respective pixels on the array of pixels to obtain pixel data for the array of pixels.

3. The electronic device defined in claim 1, wherein the display has a plurality of independently controllable viewing zones in the horizontal direction and wherein the rendered content comprises a plurality of two-dimensional images that are each associated with a respective viewing zone.

4. The electronic device defined in claim 3, wherein the two-dimensional images that are each associated with a respective viewing zone are two-dimensional images of the same content at different horizontal perspectives.

5. The electronic device defined in claim 3, wherein the plurality of two-dimensional images comprises a first subset of two-dimensional images that are the first content for the first viewer and a second subset of two-dimensional images that are the second content for the second viewer.

6. The electronic device defined in claim 5, wherein the first subset of two-dimensional images comprises two-dimensional images of the same content at different horizontal perspectives and a first vertical perspective that is based on the first vertical eye position and wherein the second subset of two-dimensional images comprises two-dimensional images of the same content at different horizontal perspectives and a second vertical perspective that is based on the third vertical eye position.

7. The electronic device defined in claim 1, wherein the control circuitry is further configured to dim at least some of the pixels based on the horizontal eye position.

8. A portable electronic device comprising:
a display that includes an array of pixels and a lens film formed over the array of pixels, wherein the lens film spreads light from the display in at least a horizontal direction;
an accelerometer;
an eye tracking system; and
control circuitry configured to:
determine, using the eye tracking system, a first position of a viewer;
determine, using the accelerometer, a change in a pose of the display;

determine, based on the change in the pose of the display and the first position of the viewer, a second position of the viewer; and render content for the display based on the second position of the viewer.

9. The portable electronic device defined in claim 8, wherein the control circuitry is further configured to:

after determining the first position of the viewer and before determining the change in the pose of the display, render content for the display based on the first position of the viewer.

10. The portable electronic device defined in claim 8, wherein the rendered content comprises a plurality of two-dimensional images and wherein the control circuitry is further configured to map each two-dimensional image to respective pixels on the array of pixels to obtain pixel data for the array of pixels.

11. The portable electronic device defined in claim 10, wherein the control circuitry is further configured to:

blur the plurality of two-dimensional images based on a vertical viewing angle associated with the second position.

12. The portable electronic device defined in claim 10, wherein the control circuitry is further configured to:

composite the plurality of two-dimensional images with a default image based on a vertical viewing angle associated with the second position.

13. The portable electronic device defined in claim 8, wherein the display has a plurality of independently controllable viewing zones in the horizontal direction and wherein the rendered content comprises a plurality of two-dimensional images that are each associated with a respective viewing zone.

14. The portable electronic device defined in claim 13, wherein the two-dimensional images that are each associated with a respective viewing zone are two-dimensional images of the same content at different horizontal perspectives.

15. A portable electronic device comprising:

a display that includes an array of pixels and a lens film formed over the array of pixels, wherein the lens film spreads light from the display in at least a horizontal direction;

at least one sensor configured to obtain sensor data; and control circuitry configured to:

determine, using the sensor data, a first position of a first viewer and a second position of a second viewer;

determine, based on the first position and the second position, that a selected one of the first viewer and the second viewer is a primary viewer; and render content for the display based on the selected one of the first viewer and the second viewer being the primary viewer, wherein at least some of the rendered content is the same for the first viewer and the second viewer.

16. The portable electronic device defined in claim 15, wherein the display has a plurality of independently controllable viewing zones in the horizontal direction and wherein the rendered content comprises a plurality of two-dimensional images that are each associated with a respective viewing zone.

17. The portable electronic device defined in claim 16, wherein the first viewer has a first eye in a first viewing zone and the second viewer has a first eye in the first viewing zone.

18. The portable electronic device defined in claim 17, wherein determining, based on the first position and the second position, that the selected one of the first viewer and the second viewer is the primary viewer comprises determining that the first viewer is the primary viewer and wherein rendering content for the display based on the selected one of the first viewer and the second viewer being the primary viewer comprises rendering content for the first viewing zone that is based on a position of the first eye.

19. The portable electronic device defined in claim 15, wherein determining, based on the first position and the second position, that the selected one of the first viewer and the second viewer is the primary viewer comprises determining that the selected one of the first viewer and the second viewer is the primary viewer based on a first distance between the display and the first viewer and a second distance between the display and the second viewer.

20. The portable electronic device defined in claim 15, wherein determining, based on the first position and the second position, that the selected one of the first viewer and the second viewer is the primary viewer comprises determining that the selected one of the first viewer and the second viewer is the primary viewer based on a first horizontal viewing angle of the first viewer and a second horizontal viewing angle of the second viewer.

21. The portable electronic device defined in claim 15, wherein determining, based on the first position and the second position, that the selected one of the first viewer and the second viewer is the primary viewer comprises determining that the selected one of the first viewer and the second viewer is the primary viewer based on a first vertical viewing angle of the first viewer and a second vertical viewing angle of the second viewer.

* * * * *